(12) United States Patent
Cho et al.

(10) Patent No.: US 6,501,861 B1
(45) Date of Patent: Dec. 31, 2002

(54) SCALABLE CODING/DECODING METHODS AND APPARATUS FOR PRODUCING STILL IMAGE USING WAVELET TRANSFORMATION

(75) Inventors: Dae-sung Cho, Seoul (KR); Se-hoon Son, Seoul (KR); Jae-seob Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/398,003

(22) Filed: Sep. 16, 1999

(30) Foreign Application Priority Data

Sep. 17, 1998 (KR) .............................. 98-38419

(51) Int. Cl.⁷ .............................. G06K 9/36; G06K 9/46

(52) U.S. Cl. ........................ 382/243; 382/240

(58) Field of Search .................... 348/397.1, 398.1, 348/437.1, 438.1; 375/240.08, 240.1, 240.11, 240.19, 240.25; 382/166, 232, 233, 234, 236, 240, 242, 243, 248

(56) References Cited

U.S. PATENT DOCUMENTS

| | | | |
|---|---|---|---|
| 5,649,032 A | 7/1997 | Burt et al. | 382/284 |
| 5,692,063 A | 11/1997 | Lee et al. | 382/107 |
| 5,991,453 A * | 11/1999 | Kweon et al. | 382/239 |
| 6,026,195 A * | 2/2000 | Eifrig et al. | 348/578 |
| 6,069,976 A * | 5/2000 | Kim | 382/239 |

FOREIGN PATENT DOCUMENTS

| | | | |  |
|---|---|---|---|---|
| EP | 0 790 741 | 8/1998 | | H04N/7/26 |
| FR | 2 788 401 | 7/2000 | | H04N/7/30 |
| WO | 99 16249 | 4/1999 | | H04N/7/30 |

OTHER PUBLICATIONS

ISO/IEC 14496–2, Committee Draft, N2202, Tokyo, Mar. 1998, pp. 71–80, paragraph 6.2.9; pp. 201–212, paragraph 7.9.

K. Hibi, et al., "MPEG–4 Video Coding Techniques," Sharp Technical Journal, Aug., 1998, No. 71, pp. 14–19.

R. Haridasan, et al., "Scalable Coding of Video Objects," IEEE International Symposium on Circuits and Systems, May 31–Jun. 3, 1998, pp. 289–292.

M. C. Lee, et al., "A Layered Video Object Coding System Using Sprite and Affine Motion Model," IEEE Transactions on Circuits and Systems for Video Technology, vol. 7, No. 1, Feb. 1, 1997, pp. 130–144.

O. Egger, et al., "High–Performance Compression of Visual Information—A Tutorial Review—Part I: Still Pictures," Proceedings of the IEEE, vol. 87, No. 6, Jun. 1999, pp. 976–1011.

(List continued on next page.)

Primary Examiner—Timothy M. Johnson
(74) Attorney, Agent, or Firm—Burns, Doane, Swecker & Mathis, LLP

(57) ABSTRACT

Shape information is scalably encoded and decoded by interleaved scan line (ISL) and raster scan line (RSL) methods and the encoded and decoded shape information is used for encoding texture information. The shape information of a chrominance (UV) component is encoded to compensate for the chrominance (UV) component. The encoding method is independently applied to the shape and texture component of each block. A scalable encoder of a still image using wavelets compresses pixels by using the characteristics between ISL pixels in a shape of the layer to be encoded or pixels between two layers in encoding the shape between layers. It is therefore possible to restore the shape and texture at high speed by performing the scalable encoding according to resolution, such as for searching for an image in a database/library. Also, tile coding a large image field to independently restore desired parts is fast and efficient.

22 Claims, 36 Drawing Sheets

OTHER PUBLICATIONS

M. Irani, et al., "Video Compression Using Mosaic Representations," Signal Processing Image Communication, vol. 7, No. 4/06, Nov. 7, 1995, pp. 529–552.

T. Chen, et al., "Coding of Subregions for Content–Based Scalable Video," IEEE Transactions on Circuits and Systems for Video Technology, vol. 7, No. 1, Feb. 1, 1997, pp. 256–260.

A. K. Katsaggelos, et al., "MPEG–4 and Rate–Distortion–Based Shape–Coding Techniques," Proceedings of the IEEE, vol. 86, No. 6, Jun. 1998, pp. 1126–1153.

A. A. Kassim, et al., "Rate Scalable Object Based Wavelet Codec for Arbitrary Color Image Regions," Picture Coding Symposium '99, Proceedings of Picture Coding Symposium, Apr. 21–23, 1999, pp. 235–238.

* cited by examiner

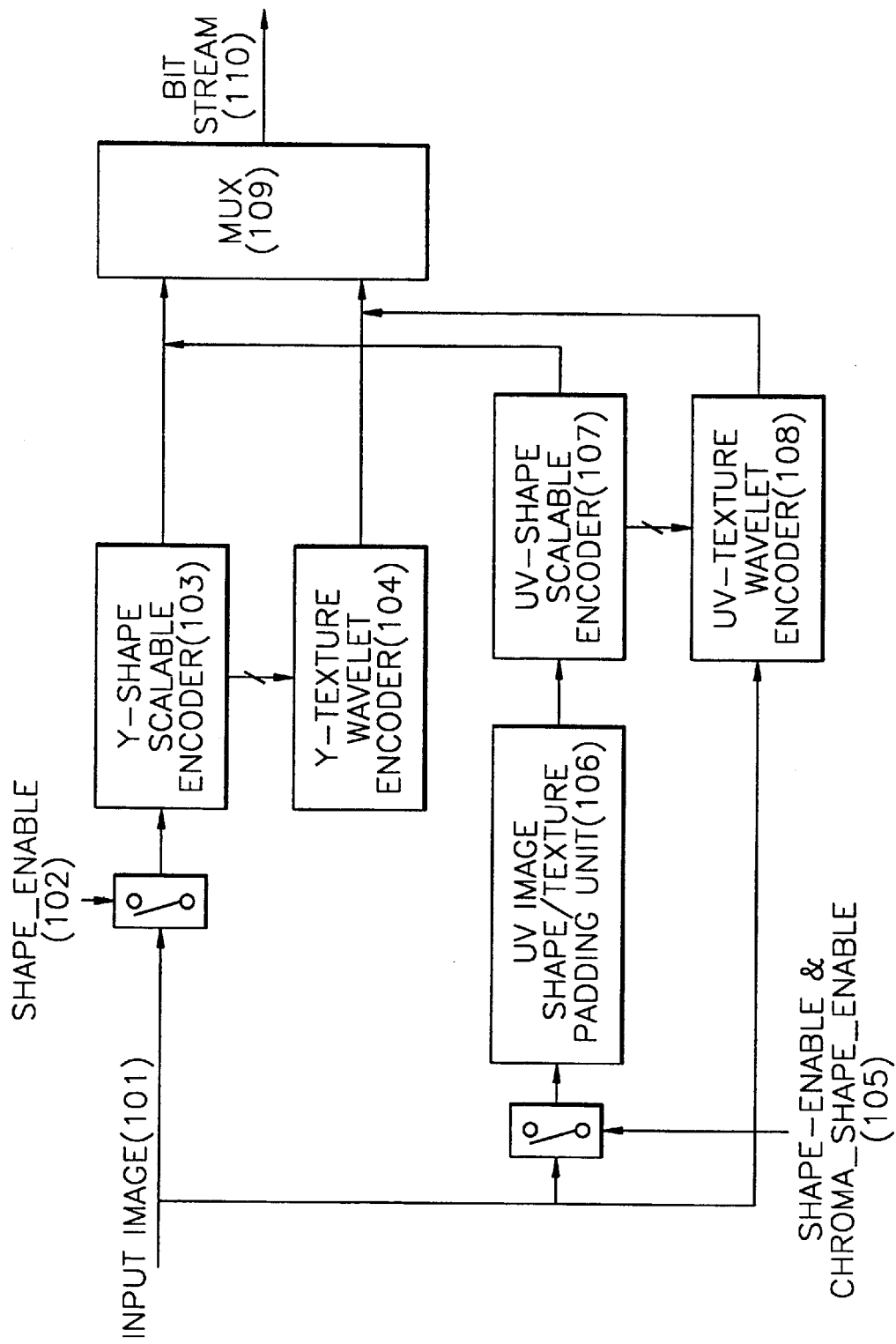

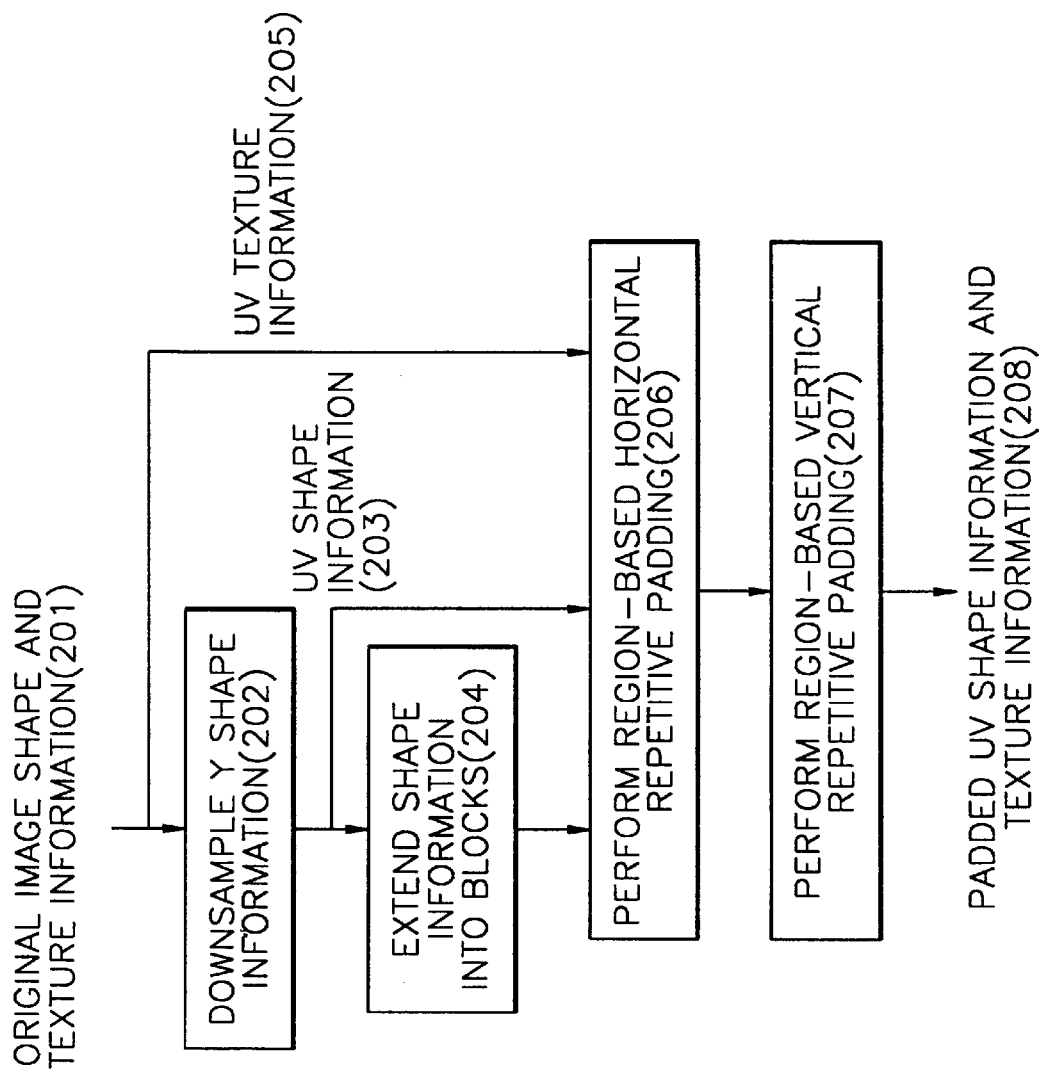

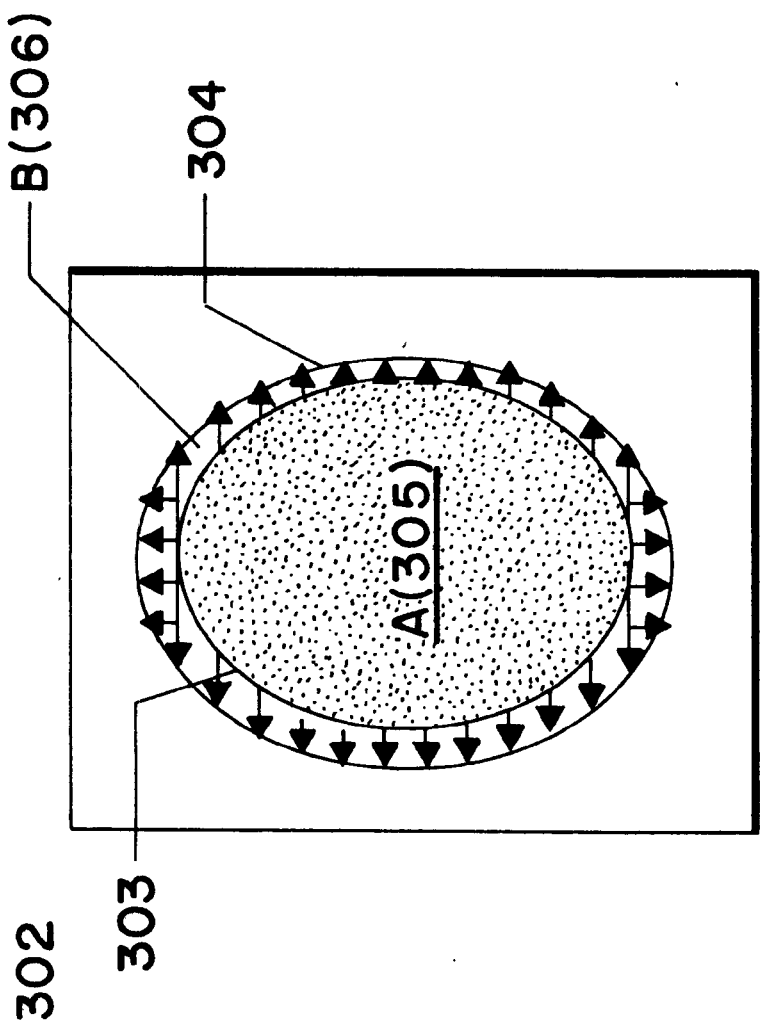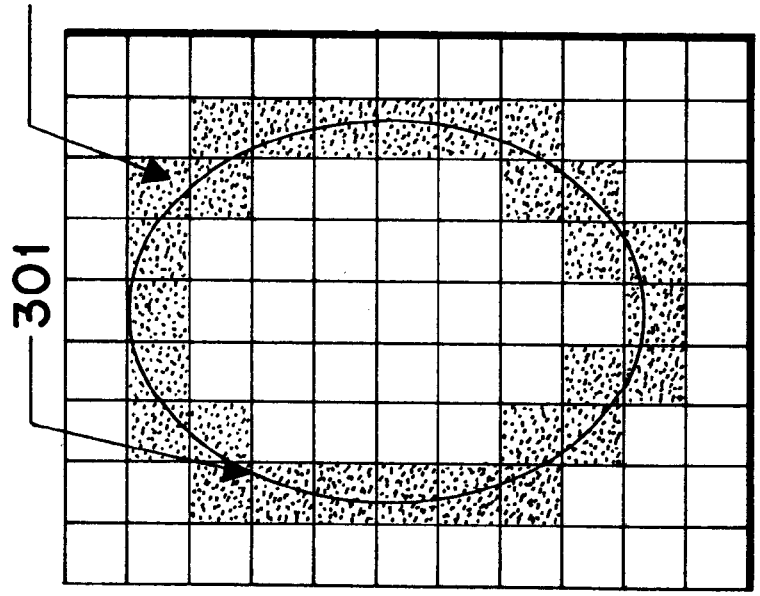

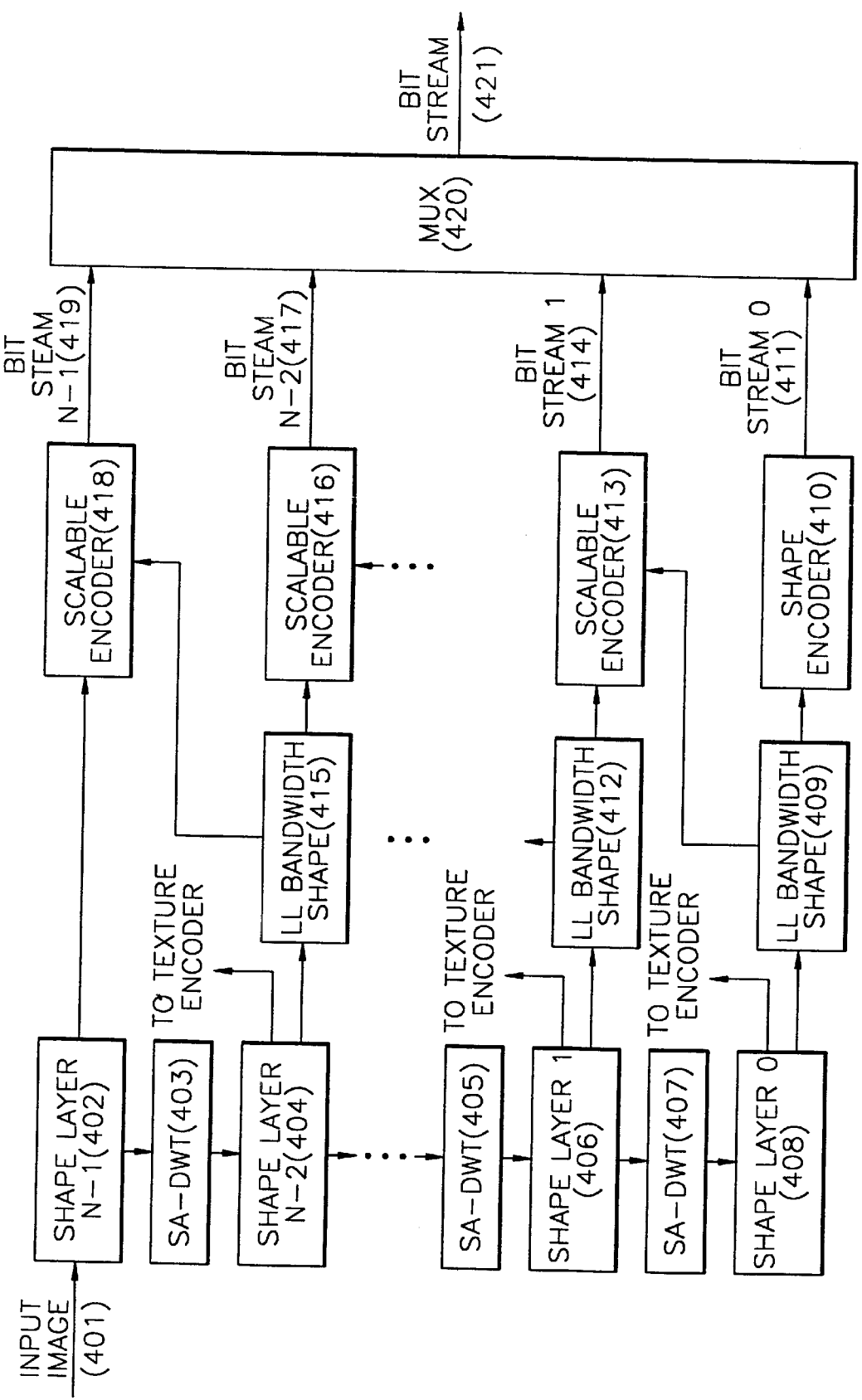

FIG. 15A

| 1 | 65 | 2 | 66 | 3 | 67 | 4 | 68 | 5 | 69 | 6 | 70 | 7 | 71 | 8 | 72 |
|---|---|---|---|---|---|---|---|---|---|---|---|---|---|---|---|
| 129 | 130 | 131 | 132 | 133 | 134 | 135 | 136 | 137 | 138 | 139 | 140 | 141 | 142 | 143 | 144 |
| 9 | 73 | 10 | 74 | 11 | 75 | 12 | 76 | 13 | 77 | 14 | 78 | 15 | 79 | 16 | 80 |
| 145 | 146 | 147 | 148 | 149 | 150 | 151 | 152 | 153 | 154 | 155 | 156 | 157 | 158 | 159 | 160 |
| 17 | 81 | 18 | 82 | 19 | 83 | 20 | 84 | 21 | 85 | 22 | 86 | 23 | 87 | 24 | 88 |
| 161 | 162 | 163 | 164 | 165 | 166 | 167 | 168 | 169 | 170 | 171 | 172 | 173 | 174 | 175 | 176 |
| 25 | 89 | 26 | 90 | 27 | 91 | 28 | 92 | 29 | 93 | 30 | 94 | 31 | 95 | 32 | 96 |
| 177 | 178 | 179 | 180 | 181 | 182 | 183 | 184 | 185 | 186 | 187 | 188 | 189 | 190 | 191 | 192 |
| 33 | 97 | 34 | 98 | 35 | 99 | 36 | 100 | 37 | 101 | 38 | 102 | 39 | 103 | 40 | 104 |
| 193 | 194 | 195 | 196 | 197 | 198 | 199 | 200 | 201 | 202 | 203 | 204 | 205 | 206 | 207 | 208 |
| 41 | 105 | 42 | 106 | 43 | 107 | 44 | 108 | 45 | 109 | 46 | 110 | 47 | 111 | 48 | 112 |
| 209 | 210 | 211 | 212 | 213 | 214 | 215 | 216 | 217 | 218 | 219 | 220 | 221 | 222 | 223 | 224 |
| 49 | 113 | 50 | 114 | 51 | 115 | 52 | 116 | 53 | 117 | 54 | 118 | 55 | 119 | 56 | 120 |
| 225 | 226 | 227 | 228 | 229 | 230 | 231 | 232 | 233 | 234 | 235 | 236 | 237 | 238 | 239 | 240 |
| 57 | 121 | 58 | 122 | 59 | 123 | 60 | 124 | 61 | 125 | 62 | 126 | 63 | 127 | 64 | 128 |
| 241 | 242 | 243 | 244 | 245 | 246 | 247 | 248 | 249 | 250 | 251 | 252 | 253 | 254 | 255 | 256 |

FIG. 15B

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 17 | 18 | 19 | 20 | 21 | 22 | 23 | 24 | 25 | 26 | 27 | 28 | 29 | 30 | 31 | 32 |
| 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 |
| 65 | 66 | 67 | 68 | 69 | 70 | 71 | 72 | 73 | 74 | 75 | 76 | 77 | 78 | 79 | 80 |
| 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 |
| 113 | 114 | 115 | 116 | 117 | 118 | 119 | 120 | 121 | 122 | 123 | 124 | 125 | 126 | 127 | 128 |
| 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 |
| 161 | 162 | 163 | 164 | 165 | 166 | 167 | 168 | 169 | 170 | 171 | 172 | 173 | 174 | 175 | 176 |
| 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 |
| 209 | 210 | 211 | 212 | 213 | 214 | 215 | 216 | 217 | 218 | 219 | 220 | 221 | 222 | 223 | 224 |
| 225 | 226 | 227 | 228 | 229 | 230 | 231 | 232 | 233 | 234 | 235 | 236 | 237 | 238 | 239 | 240 |
| 241 | 242 | 243 | 244 | 245 | 246 | 247 | 248 | 249 | 250 | 251 | 252 | 253 | 254 | 255 | 256 |

BAB PIXEL OF CURRENT LAYER

BAB PIXEL OF LOWER LAYER

CONTEXT POSITION OF ARITHMETIC CODING OF RSL MODE

CONTEXT POSITION FOR $P_2$ AND $P_3$ OF ISL MODE

CONTEXT POSITION FOR $P_1$ OF ISL MODE

FIG. 17C
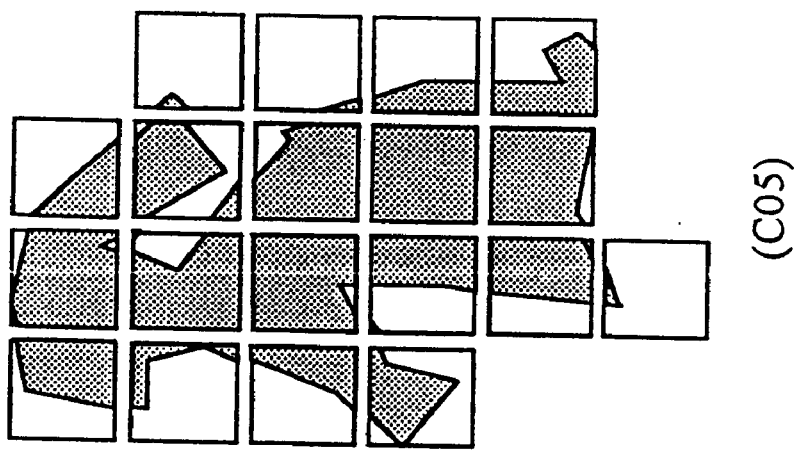
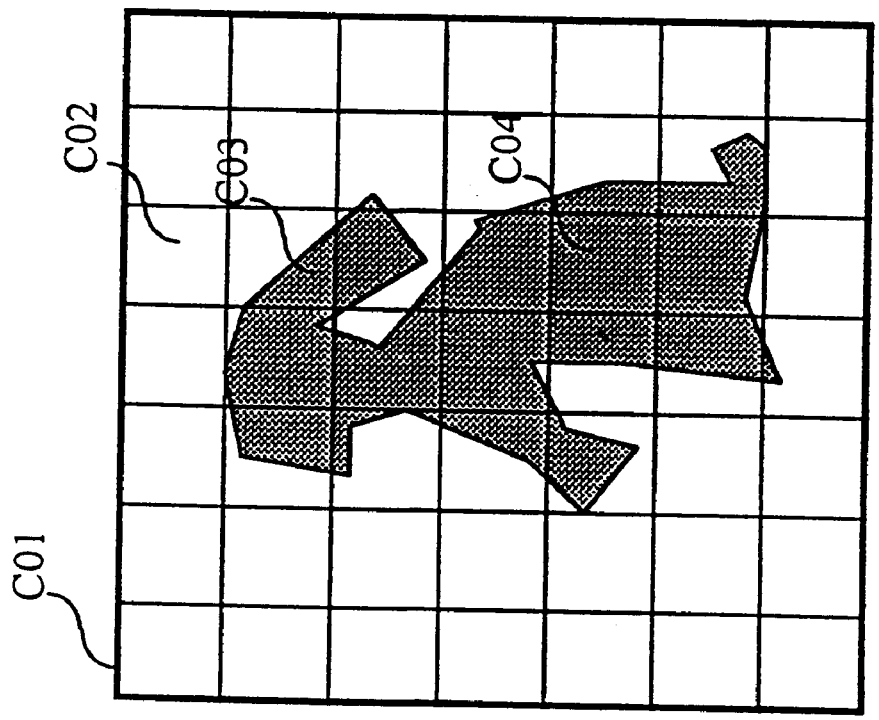

FIG. 18A(1)

| StillTextureObject( ) { | No. of bits | Mnemonic | |
|---|---|---|---|
| still_texture_object_start_code | 32 | | (L001) |
| StillTextureHeader( ) | | | (L002) |
| if(texture_object_layer_shape == "00"){ | | | (L003) |
|   texture_object_layer_width | 15 | uimsbf | (L004) |
|   marker_bit | 1 | bslbf | (L005) |
|   texture_object_layer_height | 15 | uimsbf | (L006) |
|   marker_bit | 1 | bslbf | (L007) |
| } else if (texture_object_layer_shape == "01") { | | | (L008) |
|   horizontal_ref | 15 | imsbf | (L009) |
|   marker_bit | 1 | bslbf | (L010) |

FIG. 18(A)2

| | | |
|---|---|---|
| vertical_ref | 15 | imsbf (LO11) |
| marker_bit | 1 | bslbf (LO12) |
| object_width | 15 | uimsbf (LO13) |
| marker_bit | 1 | bslbf (LO14) |
| object_height | 15 | uimsbf (LO15) |
| marker_bit | 1 | bslbf (LO16) |
| if(tiling_disable=="1") | | (LO17) |
|    shape_object_decoding() | | (LO18) |
| } | | (LO19) |
| if(tiling_disable=="0") | | (LO20) |
| StillTextureTileControl() | | (LO21) |
| StillTextureTile() | | (LO22) |

FIG. 18B(1)

| StillTextureHeader() { | No. of bits | Mnemonic | |
|---|---|---|---|
| tiling_disable | 1 | uimsbf | (L101) |
| texture_object_id | 16 | bslbf | (L102) |
| marker_bit | 1 | uimsbf | (L103) |
| wavelet_filter_type | 1 | uimsbf | (L104) |
| wavelet_download | 1 | uimsbf | (L105) |
| wavelet_decomposition_levels | 4 | uimsbf | (L106) |
| scan_direction | 1 | bslbf | (L107) |
| start_code_enable | 1 | bslbf | (L108) |
| texture_object_layer_shape | 2 | uimsbf | (L109) |
| quantization_type | 2 | uimsbf | (L110) |
| if (quantization_type == 2) { | | | (L111) |
|   spatial_scalability_levels | 4 | uimsbf | (L112) |
|   if (spatial_scalability_levels != wavelet_decomposition_levels) { | | | (L113) |

FIG. 18(B)2

| | | | |
|---|---|---|---|
| use_default_spatial_scalability | 1 | uimsbf | (L114) |
| if (use_default_spatial_layer_size ==0) | | | (L115) |
|   for (i=0; i<spatial_scalability_levels -1; i++) | | | (L116) |
|     wavelet_layer_index | 4 | | (L117) |
|   } | | | (L118) |
| } | | | (L119) |
| if (wavelet_download == "1"){ | | | (L120) |
|   uniform_wavelet_filter | 1 | uimsbf | (L121) |
|   if (uniform_wavelet_filter == "1") | | | (L122) |
|     download_wavelet_filters() | | | (L123) |
|   else | | | (L124) |
|     for (i=0; i<wavelet_decomposition_levels; i++) | | | (L125) |
|       download_wavelet_filters() | | | (L126) |
| } | | | (L127) |
| wavelet_stuffing | 3 | uimsbf | (L128) |

FIG. 18C

| StillTextureTileControl(){ | No. of bits | Mnemonic | |
|---|---|---|---|
| tile_width | 16 | uimsbf | (L201) |
| marker_bit | 1 | bslbf | (L202) |
| tile_height | 16 | uimsbf | (L203) |
| marker_bit | 1 | bslbf | (L204) |
| number_of_tiles | 16 | uimsbf | (L205) |
| marker_bit | 1 | bslbf | (L206) |
| tiling_jump_table_enable | 1 | bslbf | (L207) |
| if (tiling_jump_table_enable=="1" ) { | | | (L208) |
|   for (i=0;i<number_of_tiles;i++ ) { | | | (L209) |
|     tile_size_high | 16 | uimsbf | (L210) |
|     market_bit | 1 | bslbf | (L211) |
|     tile_size_low | 16 | uimsbf | (L212) |
|     market_bit | 1 | bslbf | (L213) |
|   } | | | (L214) |
| } | | | (L215) |
| next_start_code() | | | (L216) |

FIG. 18D

| | No. of bits | Mnemonic | |
|---|---|---|---|
| StillTextureTile( ) { | | | (L301) |
|   do { | | | (L302) |
|     if(tiling_disable == "0"){ | | | (L303) |
|       texture_tile_start_code | 32 | bslbf | (L304) |
|       tile_id | 16 | uismbf | (L305) |
|       if (texture_object_layer_shape == "01") { | | | (L306) |
|         marker_bit | 1 | bslbf | (L307) |
|         texture_tile_type | 2 | uimsbf | (L308) |
|         marker_bit | 1 | bslbf | (L309) |
|       } | | | (L310) |
|       if (texture_object_layer_shape == "01" &&<br>        texture_tile_type=="boundary tile") | | | (L311) |
|         shape_object_decoding( ) | | | (L312) |
|     } | | | (L313) |
|     StillTextureDecoding( ) | | | (L314) |
|     if(tiling_disable=="0") | | | (L315) |
|       next_start_code( ) | | | (L316) |
|   } while(nextbits_bytealigned( )==texture_tile_start_code) | | | (L317) |

FIG. 18E(1)

| | No. of bits | Mnemonic | |
|---|---|---|---|
| shape_object_decoding() { | | | |
|   change_conv_ratio_disable | 1 | bslbf | (L401) |
|   sto_constant_alpha | 1 | bslbf | (L402) |
|   if (sto_constant_alpha) | | | (L403) |
|     sto_constant_alpha_value | 8 | bslbf | (L404) |
|   marker_bit | 1 | bslbf | (L405) |
|   for(i=0; i<shape_base_layer_height_blocks(); i++) { | | | (L406) |
|     for(j=0; j<shape_base_layer_width_blocks(); j++) { | | | (L407) |
|       bab_type | 1-2 | vlclbf | (L408) |
|       if (bab_type == 4) { | | | (L409) |
|         if (!change_conv_ratio_disable) | | | (L410) |
|           conv_ratio | 1-2 | vlclbf | (L411) |
|         scan_type | 1 | bslbf | (L412) |
|         binary_arithmetic_decode() | | | (L413) |
|       } | | | (L414) |
|     } | | | (L415) |
|   } | | | (L416) |
|   marker_bit | 1 | bslbf | (L417) |
|   if (!start_code_enable) { | | | (L418) |
|     sto_shape_coded_layers | 4 | uimsbf | (L419) |
|   marker_bit | 1 | bslbf | (L420) |

FIG. 18E(2)

| | | | |
|---|---|---|---|
| `for(k = 0; k<sto_shape_coded_layers; k++)` | | | (L421) |
| `  for(i=O; i<shape_enhanced_layer_height_blocks(); i++)` | | | (L422) |
| `    for(j=O; j<shape_enhanced_layer_width_blocks(); j++)` | | | (L423) |
| `      enh_binary_arithmetic_decode()` | | | (L424) |
| `    marker_bit` | 1 | bslbf | (L425) |
| `  }` | | | (L426) |
| `}` | | | (L427) |
| `else {` | | | (L428) |
| `  next_start_code()` | | | (L429) |
| `  while (nextbits() == texture_shape_layer_start_code) {` | | | (L430) |
| `    texture_shape_layer_start_code` | 32 | bslbf | (L431) |
| `    texture_shape_layer_id` | 5 | uimsbf | (L432) |
| `    marker_bit` | 1 | bslbf | (L433) |
| `    for(i=O;i<shape_enhanced_layer_height_blocks(); i++)` | | | (L434) |
| `      for(j=O; j<shape_enhanced_layer_width_blocks();j++)` | | | (L435) |
| `        enh_binary_arithmetic_decode()` | | | (L436) |
| `    marker_bit` | 1 | bslbf | (L437) |
| `    next_start_code()` | | | (L438) |
| `  }` | | | (L439) |
| `  texture_spatial_layer_start_code` | 32 | bslbf | (L440) |
| `  texture_spatial_layer_id` | 5 | uimsbf | (L441) |
| `  marker_bit` | 1 | bslbf | (L442) |
| `}` | | | (L443) |

FIG. 18F(1)

| | No. of bits | Mnemonic |
|---|---|---|
| StillTextureDecoding() { | | |
|   for (color = "y", "u", "v"){ | | (L501) |
|     wavelet_dc_decode() | | (L502) |
|   } | | (L503) |
|   if(quantization_type == 1) { | | (L504) |
|     TextureLayerSQ ( ) | | (L505) |
|   } | | (L506) |
|   else if (quantization_type == 2){ | | (L507) |
|     if (start_code_enable ==1) { | | (L508) |
|       do { | | (L509) |
|         TextureSpatialLayerMQ ( ) | | (L510) |
|       } while (next_bits() == texture_spatial_layer_start_code) | | (L511) |
|     } else { | | (L512) |
|       for (i=0; i<spatial_scalability_levels; i++) | | (L513) |
|         TextureSpatialLayerMQNSC ( ) | | (L514) |
|   } | | (L515) |

FIG. 18(F)2

| | | | |
|---|---|---|---|
| `}` | | | (L516) |
| `else if (quantization_type == 3){` | | | (L517) |
| `for (color = "y", "u", "v")` | | | (L518) |
| `do{` | | | (L519) |
| `    quant_byte` | 8 | uimsbf | (L520) |
| `} while(quant_byte >>7)` | | | (L521) |
| `max_bitplanes` | 5 | uimsbf | (L522) |
| `if (scan_direction == 0) {` | | | (L523) |
| `    do {` | | | (L524) |
| `        TextureSNRLayerBQ ( )` | | | (L525) |
| `    } while ((next_bits( ) == texture_snr_layer_start_code)` | | | (L526) |
| `} else {` | | | (L527) |
| `    do {` | | | (L528) |
| `        TextureSpatialLayerBQ ( )` | | | (L529) |
| `    } while ( next_bits( ) == texture_spatial_layer_start_code )` | | | (L530) |
| `}` | | | (L531) |
| | | | (L532) |

US 6,501,861 B1

SCALABLE CODING/DECODING METHODS AND APPARATUS FOR PRODUCING STILL IMAGE USING WAVELET TRANSFORMATION

This application claims priority under 35 U.S.C. §§119 and/or 365 to 98-38419 filed in Korea on Sep. 17, 1998; the entire content of which is hereby incorporated by reference.

BACKGROUND OF THE INVENTION

1. Field of the Invention

The present invention relates to scalable coding/decoding methods and apparatus used in a still image encoder using wavelet transformation.

2. Description of the Related Art

In a conventional shape information coding method used in a still image encoder using wavelet transformation, pixel information of shapes of all layers output in a process of dividing wavelet must be encoded. In this case, when a scalable coding method is used, the number of pixels to be coded remarkably increases compared with the case where the entire shape information is directly encoded. Accordingly, the efficiency of coding decreases. Also, a system becomes more complicated as the number of pixels to be coded increases. When the size of an input image is large, this effect becomes more pronounced. Accordingly, it takes a long time to restore an overall image.

SUMMARY OF THE INVENTION

It is an object of the present invention to provide a still image scalable coding method and an apparatus for dividing a still image into blocks, classifying the divided blocks according to the possibility of using exclusive OR information of each pixel, and encoding the blocks according to classified encoding modes so that arbitrary shape information can be efficiently encoded by a wavelet-based still image encoder.

It is another object of the present invention to provide a decoding method and apparatus corresponding to the wavelet-based still image scalable coding method and apparatus.

It is still another object of the present invention to provide still image coding and decoding methods of dividing an input image having an arbitrary shape into tiles and independently restoring a part of an image desired by a user without a large amount of calculation, from compressed data.

Accordingly, to achieve the first object, there is provided a method of scalably encoding shape information on a still image using a wavelet transformation, comprising the steps of wavelet transforming and scalably encoding shape information on a luminance (Y) component, wavelet encoding texture information on the luminance (Y) component using the shape information on the wavelet transformed luminance (Y) component, padding shape information and texture information on a chrominance (UV) component using the shape information on the luminance (Y) component and texture information on the chrominance (UV) component, wavelet transforming and scalably encoding the padded shape information on the chrominance (UV) component, and wavelet encoding the texture information on the chrominance (UV) component using the shape information on the wavelet transformed chrominance (UV) component.

In a method of scalably encoding shape information on a still image using a wavelet transformation according to the present invention, the steps of scalably encoding the shape information on the luminance (Y) component and scalably encoding the padded shape information on the chrominance (UV) component each comprises the steps of obtaining respective layers by shape adaptive discrete transforming input shape information, encoding the low frequency bandwidth shape information of the lowest shape layer, scalably encoding the low frequency bandwidth shape information of each layer using the low frequency bandwidth shape information of lower layer with respect to each of the shape layers excluding the lowest shape layer, and transmitting the encoded shape information from the lowest layer to uppermost layer.

In a method of scalably encoding shape information on a still image using a wavelet transformation according to the present invention, the step of scalably encoding the low frequency bandwidth shape information of each layer comprises the steps of dividing the low frequency bandwidth shape information of the current layer and the low frequency bandwidth shape information of lower layers into blocks, bordering the respective blocks in the shape information, and determining the encoding mode, performing arithmetic coding on the determined encoding mode, and encoding the bordered block according to the determined encoding modes, with respect to each of the bordered blocks.

In a method of scalably encoding shape information on a still image using a wavelet transformation according to the present invention, when a 1×1 pixel value $P_L$ of a binary alpha block (BAB) $f_1(i, j)$ of a lower layer corresponds to 2×2 pixel values $P_0$, $P_1$, $P_2$, and $P_3$ of a BAB $f_2(i, j)$ of the current layer, the encoding mode is determined to be an interleaved scan line (ISL) mode when all of the following conditions are satisfied with respect to all pixels in the BAB of the lower layers, and the encoding mode is determined to be a raster scan line (RSL) mode when any of the following conditions are not all satisfied.

ondition1=$(f_2(2i, 2j)==f_1(i, j))$ ondition2=$!(!(f_2(2i, 2j)\oplus f_2(2i+2, 2j)\&\&(f_2(2i+1, 2j)!=f_2(2i, 2j))$ ondition3=$!(!(f_2(2i, 2j)\oplus f_2(2i, 2j+2)\&\&(f_2(2i, 2j+1)!=f_2(2i, 2j))$ ondition4=$!(!(f_2(2i+1, 2j)\oplus f_2(2i+1, 2j+2)\&\&(f_2(2i+1, 2j+1)!=f_2(2i+1, 2j))$ In a method of scalably encoding shape information on a still image using a wavelet transformation according to the present invention, when the encoding mode is the ISL encoding mode, with respect to each pixel of the block, the step of encoding each bordered block comprises the steps of not encoding $P_0$ when the pixel value to be encoded is $P_0$, calculating context information showing the arrangement of pixels of the current layer around the pixel to be encoded and a probability value for performing arithmetic coding on the pixel to be encoded only when left and right pixel values of the pixel value to be encoded are different from each other and performing the arithmetic encoding on $P_1$ when the pixel value to be encoded is $P_1$, and calculating the context information showing the arrangement of pixels of the current layer around the pixel to be encoded and the probability value for performing the arithmetic coding on the pixel to be encoded only when the pixel values above and below the pixel value to be encoded are different from each other and performing the arithmetic coding on $P_2$ or $P_3$ when the pixel value to be encoded is P2 or $P_3$.

In a method of scalably encoding shape information on a still image using a wavelet transformation according to the present invention, when the encoding mode is the RSL mode with respect to each pixel of the block, the step of encoding each bordered block comprises the steps of not encoding $P_0$ when the pixel value to be encoded is $P_0$ and the corresponding $P_L$ is 0, calculating the context information showing the arrangement of pixels of the current layer and lower layers around the pixel to be encoded and the probability value for performing the arithmetic coding on the pixel to be encoded and performing the arithmetic coding on $P_0$ when the pixel value to be encoded is $P_0$ and the corresponding pixel value $P_L$ is not 0, and calculating the context information showing the arrangement of the pixels of the current layer and the lower layers around the pixel to be encoded and the probability value for performing the arithmetic coding on the pixel to be encoded and performing the arithmetic coding on $P_1$, $P_2$, or $P_3$ when the pixel value to be encoded is $P_1$, $P_2$, or $P_3$.

There is provided a method of scalably encoding shape information on a still image using a wavelet transformation, comprising the steps of wavelet transforming the shape information on the luminance (Y) component by an even symmetry wavelet filter and scalably encoding the shape information on the luminance (Y) component, wavelet encoding the texture information on the luminance (Y) component using the shape information on the wavelet transformed luminance (Y) component, and wavelet encoding the texture information on the chrominance (UV) component using the shape information on the wavelet transformed luminance (Y) component.

In a method of scalably encoding shape information on a still image using a wavelet transformation according to the present invention, the step of padding the shape information and texture information on the chrominance (UV) component comprises the steps of obtaining downsampled shape information from shape information on the luminance (Y) component for compensating for the chrominance (UV) component of 4:2:0 or 4:2:2, dividing the downsampled shape information into blocks corresponding to the number of layers and extending the shape information to a region including all pixels of boundary blocks which are partially comprising the shape respectively, and obtaining texture information corresponding to the extended region by padding the texture information on the chrominance (UV) component in the horizontal and vertical directions.

To achieve the second object, there is provided a method for scalably decoding encoded shape information on a still image using wavelet transformation, comprising the steps of scalably decoding and wavelet transforming the encoded shape information on the luminance (Y) component, wavelet decoding the encoded texture information on the luminance (Y) component using the shape information on the wavelet transformed luminance (Y) component, scalably decoding and wavelet transforming the encoded shape information on the chrominance (UV) component, and wavelet decoding the encoded texture information on the chrominance (UV) component using the shape information on the wavelet transformed chrominance (UV) component wavelet transformed.

In a method for scalably decoding encoded shape information on a still image using wavelet transformation according to the present invention, the steps of wavelet transforming the encoded shape information on the luminance (Y) component and wavelet transforming the encoded shape information on the chrominance (UV) component each comprise the steps of receiving encoded shape information from the lowest layer to uppermost layer, obtaining the low frequency bandwidth shape information of the lowest layer by decoding the encoded shape information of the lowest layer, scalably decoding the low frequency bandwidth shape information by decoding the encoded shape information of each layer using the low frequency bandwidth shape information of lower layers with respect to the respective layers excluding the lowest layer, and obtaining the respective layers by shape adaptive discrete wavelet transforming the low frequency bandwidth shape information of the decoded respective layers.

In a method for scalably decoding encoded shape information on a still image using wavelet transformation according to the present invention, the step of scalably decoding the low frequency bandwidth shape information comprises the steps of receiving encoded shape information and dividing the shape information of the current shape layer and the shape information of the lower layers into blocks, bordering the respective blocks in the shape information, and performing arithmetic decoding on the encoding modes of the respective bordered blocks and decoding the encoded shape information in each block according to the decoded encoding mode.

In a method for scalably decoding encoded shape information on a still image using wavelet transformation according to the present invention, when a 1×1 pixel value $P_L$ of a binary alpha block (BAB) $f_1(i, j)$ of a lower layer corresponds to 2×2 pixel values $P_0$, $P_1$, $P_2$, and $P_3$ of a BAB $f_2(i, j)$ of the current layer, the encoding mode is determined to be an interleaved scan line (ISL) mode when all of the following conditions are satisfied with respect to all pixels in the BAB of the lower layers and the encoding mode is determined as a raster scan line (RSL) mode when any of the following conditions are not satisfied.

ondition1=$(f_2(2i, 2j)==f_1(i, j))$ ondition2=!(!$(f_2(2i, 2j) \oplus f_2(2i+2, 2j)$&&$(f_2(2i+1, 2j)!=f_2(2i, 2j))$ ondition3=!(!$(f_2(2i, 2j) \oplus f_2(2i, 2j+2)$&&$(f_2(2i, 2j+1)!=f_2(2i, 2j))$ ondition4=!(!$(f_2(2i+1, 2j) \oplus f_2(2i+1, 2j+2)$&&$(f_2(2i+1, 2j+1)!=f_2(2i+1, 2j))$ In a method for scalably decoding encoded shape information on a still image using wavelet transformation according to the present invention, when the encoding mode is the ISL encoding mode, with respect to each pixel of the block, the step of decoding the encoded shape information in each block comprises the steps of restoring $P_0$ by $P_L$ when the pixel value to be decoded is $P_0$, restoring $P_0$ by the pixel value to the left or right of the pixel value to be decoded when the pixel value to be decoded is $P_1$ and the pixel values to the left and right of the pixel value are equal to each other, and calculating the context information showing the arrangement of the pixels of the current layer around the pixel to be decoded and the probability value for performing the arithmetic decoding on the pixel to be decoded and performing the arithmetic decoding on $P_1$ when the pixel value to be decoded is $P_1$ and the pixel values to the left and right of the pixel value to be decoded are different from each other, and decoding $P_2$ or $P_3$ by the pixel value above or below the pixel value to be decoded when the pixel value to be decoded is $P_2$ or $P_3$ and the pixel values above or below the pixel value are equal to each other and calculating the context information showing the arrangement of the pixels of the current layer around the pixel to be encoded and probability value for performing arithmetic decoding on the pixel to be decoded and performing arithmetic decoding on $P_2$ or $P_3$ when the pixel value to be decoded is $P_2$ or $P_3$ and the pixel values above and below the pixel value are different from each other.

In a method for scalably decoding encoded shape information on a still image using wavelet transformation according to the present invention, when the encoding mode is the RSL encoding mode, with respect to each pixel of the block, the step of decoding the encoded shape information in each block comprises the steps of restoring $P_0$ by 0 when the pixel value to be decoded is $P_0$ and the corresponding $P_L$ is 0, calculating the context information showing the arrangement of the pixels of the current layer and the lower layers around the pixel to be decoded and the probability value for performing the arithmetic decoding on the pixel to be decoded and performing the arithmetic decoding on $P_0$ when the pixel value to be decoded is $P_0$ and the corresponding $P_L$ is not 0, and calculating the context information showing the arrangement of the pixels of the current layer and the lower layers around the pixel to be decoded and the probability value for performing the arithmetic decoding on the pixel to be decoded and performing the arithmetic decoding on $P_1$, $P_2$, or $P_3$ when the pixel value to be decoded is $P_1$, $P_2$, or $P_3$.

To achieve the third object, there is provided an apparatus for scalably encoding shape information on a still image using wavelet transformation, comprising a shape information scalable encoder for wavelet transforming and scalably encoding the shape information of a luminance (Y) component and a chrominance (UV) component, a chrominance (UV) image shape/texture padding unit for padding shape information and texture information of a chrominance (UV) component using shape information of a luminance (Y) component and texture information of a chrominance (UV) component with respect to 4:2:0 or 4:2:2 shape information, and a texture information wavelet encoder for wavelet encoding the texture information of the luminance (Y) component and the chrominance (UV) component using the shape information wavelet transformed by the shape information scalable encoder.

In an apparatus for scalably encoding shape information on a still image using wavelet transformation according to the present invention, the shape information scalable encoder comprises a luminance (Y) shape scalable encoder for wavelet transforming and scalably encoding the shape information of the luminance (Y) component and a chrominance (UV) shape scalable encoder for wavelet transforming and scalably encoding the shape information of the chrominance (UV) component padded by the chrominance (UV) image shape/texture padding unit.

In an apparatus for scalably encoding shape information on a still image using wavelet transformation according to the present invention, the luminance (Y) shape scalable encoder and the chrominance (UV) shape scalable shape encoder each comprises a plurality of shape adaptive discrete wavelet transformers for receiving shape layers and generating the shape layers of lower layers, a shape encoder for encoding the low frequency bandwidth shape information of the lowest shape layer, a plurality of scalable encoders for scalably encoding the low frequency bandwidth shape information of the respective layers using the low frequency bandwidth shape information of the lower layers with respect to the respective shape layers excluding the lowest shape layer, and a multiplexer for transmitting the encoded shape information from the lowest layer to the upper layers.

In an apparatus for scalably encoding shape information on a still image using wavelet transformation according to the present invention, each scalable encoder comprises means for dividing the low frequency bandwidth shape information of the current layer and the low frequency bandwidth shape information of the lower layers into blocks, means for bordering the respective blocks in the shape information, means for determining the encoding mode according to the possibility of using exclusive OR information of each pixel in the bordered block, means for scanning the respective pixels in a block in the ISL order and omitting encoding the pixels when exclusive OR information can be used and obtaining the context information and performing the arithmetic coding on the pixels when the exclusive OR information cannot be used, when the encoding mode is the ISL encoding mode, and scanning the respective pixels in a block in the RSL order, obtaining the context information and performing the arithmetic coding on the pixels when the encoding mode is the RSL encoding mode.

To achieve the third object, here is provided an apparatus for scalably decoding encoded shape information on a still image using wavelet transformation, comprising a shape information scalable decoder for scalably decoding and wavelet transforming the encoded shape information on the luminance (Y) component and the chrominance (UV) component and a texture information wavelet decoder for wavelet decoding encoded texture information on the luminance (Y) component and the chrominance (UV) component using the shape information wavelet transformed by the shape information scalable decoder.

In an apparatus for scalably decoding encoded shape information on a still image using wavelet transformation according to the present invention, the shape information scalable decoder comprises a luminance (Y) shape scalable decoder for scalably decoding and wavelet transforming the encoded shape information on the luminance (Y) component and a chrominance (UV) shape scalable decoder for scalably decoding and wavelet transforming the encoded shape information on the chrominance (UV) component.

In an apparatus for scalably decoding encoded shape information on a still image using wavelet transformation according to the present invention, the luminance (Y) shape scalable decoder and the chrominance (UV) shape scalable shape decoder each comprises a demultiplexer for distributing the encoded shape information from the lowest layer to upper layers, a shape decoder for obtaining the low frequency bandwidth shape information of the lowest layer by decoding the encoded shape information of the lowest shape layer, a plurality of scalable decoders for scalably decoding the low frequency bandwidth shape information by decoding the encoded shape information of the respective layers using the low frequency bandwidth shape information, with respect to the respective shape layers excluding the lowest shape layer, and a plurality of shape adaptive discrete wavelet transformers for obtaining each of the shape layers by shape adaptive discrete wavelet transforming the decoded low frequency bandwidth shape information of the respective layers.

In an apparatus for scalably decoding encoded shape information on a still image using wavelet transformation according to the present invention, each scalable decoder comprises means for receiving encoded shape information and dividing the shape information of the current layer and the shape information of the lower layers into blocks, means for bordering the respective blocks in the shape information, means for performing arithmetic decoding on the encoding mode determined according to the possibility of using the exclusive OR information of the respective pixels in the bordered block, means for scanning the respective pixels in a block in the ISL order decoding and decoding the pixels by exclusive OR information when the exclusive OR information can be used and obtaining the context information and performing the arithmetic decoding on the pixels when the exclusive OR information cannot be used, when the encoding mode is the ISL encoding mode, and means for scanning the respective pixels in a block, obtaining the context information, and performing the arithmetic decoding on the pixels, when the encoding mode is the ISL encoding mode.

To achieve the third object, there is provided a method for scalably encoding a still image using wavelet transformation, comprising the steps of dividing an input object having an arbitrary shape into tiles having a uniform size and classifying a control component, encoding a control signal with respect to each tile, wavelet transforming shape and texture information, scalably encoding the values of the respective layers, and encoding object information in a tile, with respect to each tile, and sequentially connecting encoded bit streams with respect to each tile.

To achieve the third object, there is provided a method for decoding a bit stream obtained by scalably encoding a still image using wavelet transformation, comprising the steps of receiving encoded bit stream, dividing the encoded bit stream into objects and classifying a control component from a plurality of tile components in bit streams with respect to the respective objects, decoding the control component, scalably decoding shape and texture information and decoding object information in a tile, with respect to each tile component, composing the object information items decoded with respect to the respective tile components using the decoded control component in each object, and composing a plurality of object information items on a screen.

To achieve the third object, there is provided an apparatus for scalably encoding a still image using wavelet transformation, comprising one or more tile dividers dividing an input object having an arbitrary shape into tiles having a uniform size and classifying control components, one or more control signal encoders for encoding control components classified by the tile dividers, a plurality of image encoders for receiving tiles divided by the tile dividers, wavelet transforming shape and texture information in the tiles, and scalably encoding the values of the respective layers, and a multiplexer for sequentially connecting encoded bit streams to the respective tiles.

To achieve the third object, there is provided an apparatus for decoding a bit stream obtained by scalably encoding a still image using wavelet transformation, comprising a demultiplexer for receiving the encoded bit stream, dividing the encoded bit stream into objects, and classifying a control component and a plurality of tile components in the bit stream with respect to each object, one or more control signal decoders for decoding the control component, a plurality of still image decoders for receiving a tile component and scalably decoding shape and texture information in the tile, one or more tile compositors for composing the decoded tile component in each object, and an object compositor for composing a plurality of object information items composed by the tile compositor on a screen.

BRIEF DESCRIPTION OF THE DRAWINGS

The above objects and advantages of the present invention will become more apparent by describing in detail a preferred embodiment thereof with reference to the attached drawings in which:

FIGS. 1A and 1B are block diagrams showing the structures of a still image encoder and a still image decoder using wavelet transformation;

FIG. 2 is a flowchart showing region-based padding processes;

FIGS. 3A and 3B respectively illustrate a method of extending shape information to blocks and the padding of the shape information in units of a region;

FIG. 4 is a block diagram showing the structure of a scalable shape encoder using wavelet transformation;

FIGS. 15A and 15B show the orders in which the pixels of a block are encoded in an ISL encoding mode and a RSL encoding mode, respectively;

FIG. 17C shows an arbitrarily shaped object in a tile structure;

FIGS. 18A through 18F show syntaxes of bit-streams compressed by the still image encoder according to the present invention;

DESCRIPTION OF THE PREFERRED EMBODIMENTS

Hereinafter, the present invention will be described in detail with reference to the attached drawings.

Figure 1B:
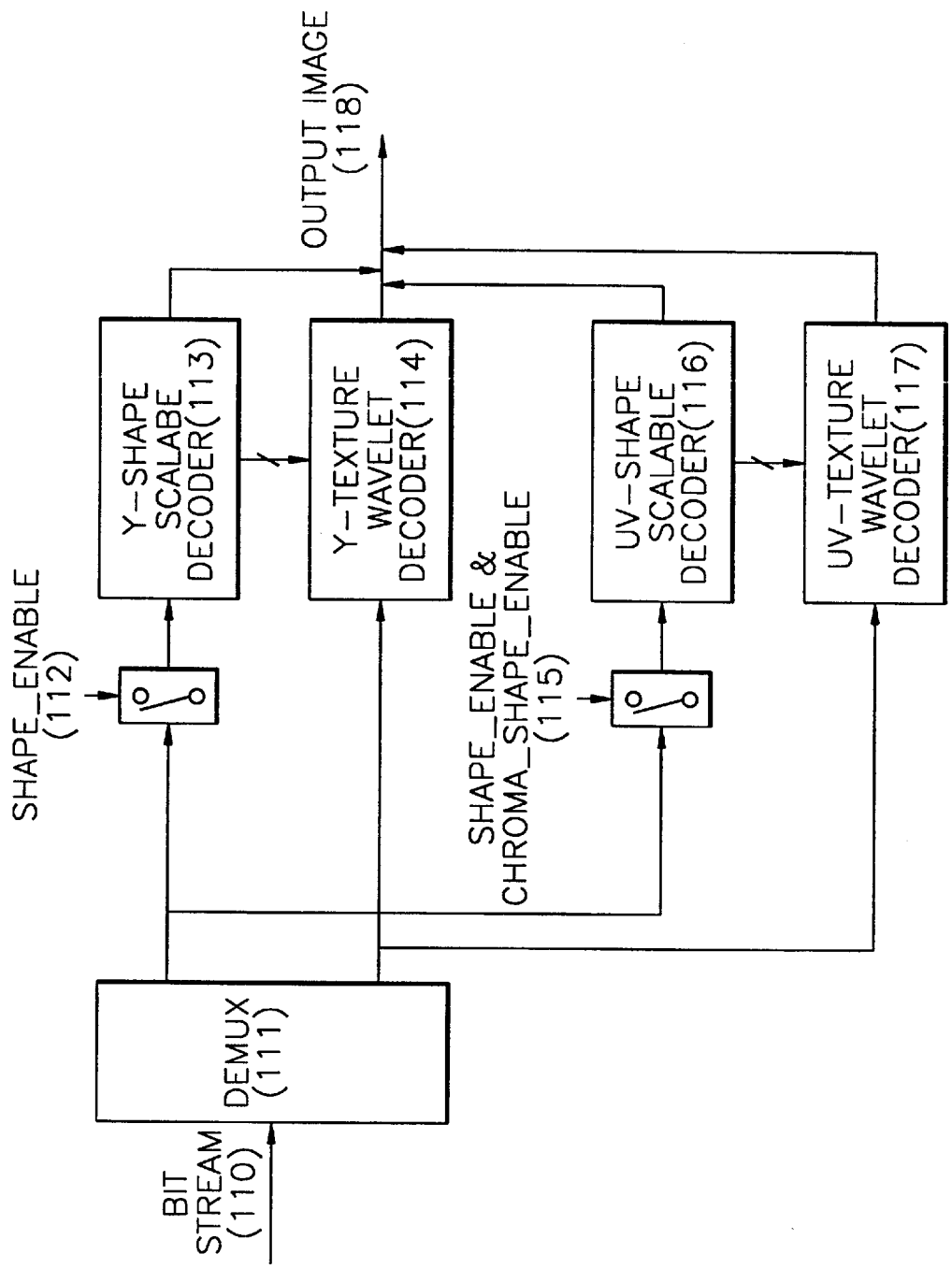

Referring to FIG. 1A, an embodiment of a still image encoder using wavelet transformation according to the present invention includes a luminance (Y) (Y) shape scalable encoder 103, a luminance (Y) (Y) texture wavelet encoder 104 using wavelet transformation, a chrominance (UV) (UV) image shape/texture padding unit 106, a chrominance (UV) (UV) shape scalable encoder 107, a chrominance (UV) (UV) texture wavelet encoder 108 using wavelet transformation and a multiplexer 109. Referring to FIG. 1B, an embodiment of a still image decoder using wavelet transformation for restoring an image from an encoded bit stream includes a luminance (Y) (Y) shape scalable encoder 113, a luminance (Y) (Y) texture wavelet decoder 114, a chrominance (UV) shape scalable decoder 116, and a chrominance (UV) texture wavelet decoder 117.

In a color image having a format of 4:2:0 or 4:2:2, the padding of shape and texture information is required in order to solve the fading of colors in each scalable layer. Referring to FIG. 2, the padding of the shape and texture information consists of processes of obtaining shape information of a chrominance (UV) component by downsampling shape information of a luminance (Y) component, extending the obtained shape information of the chrominance (UV) component to blocks, and repeatedly padding the shape information extended to blocks in horizontal and vertical directions using the shape information of the chrominance (UV) information, the extended shape information of the chrominance (UV) information, and texture information of the chrominance (UV) information.

Figure 12:
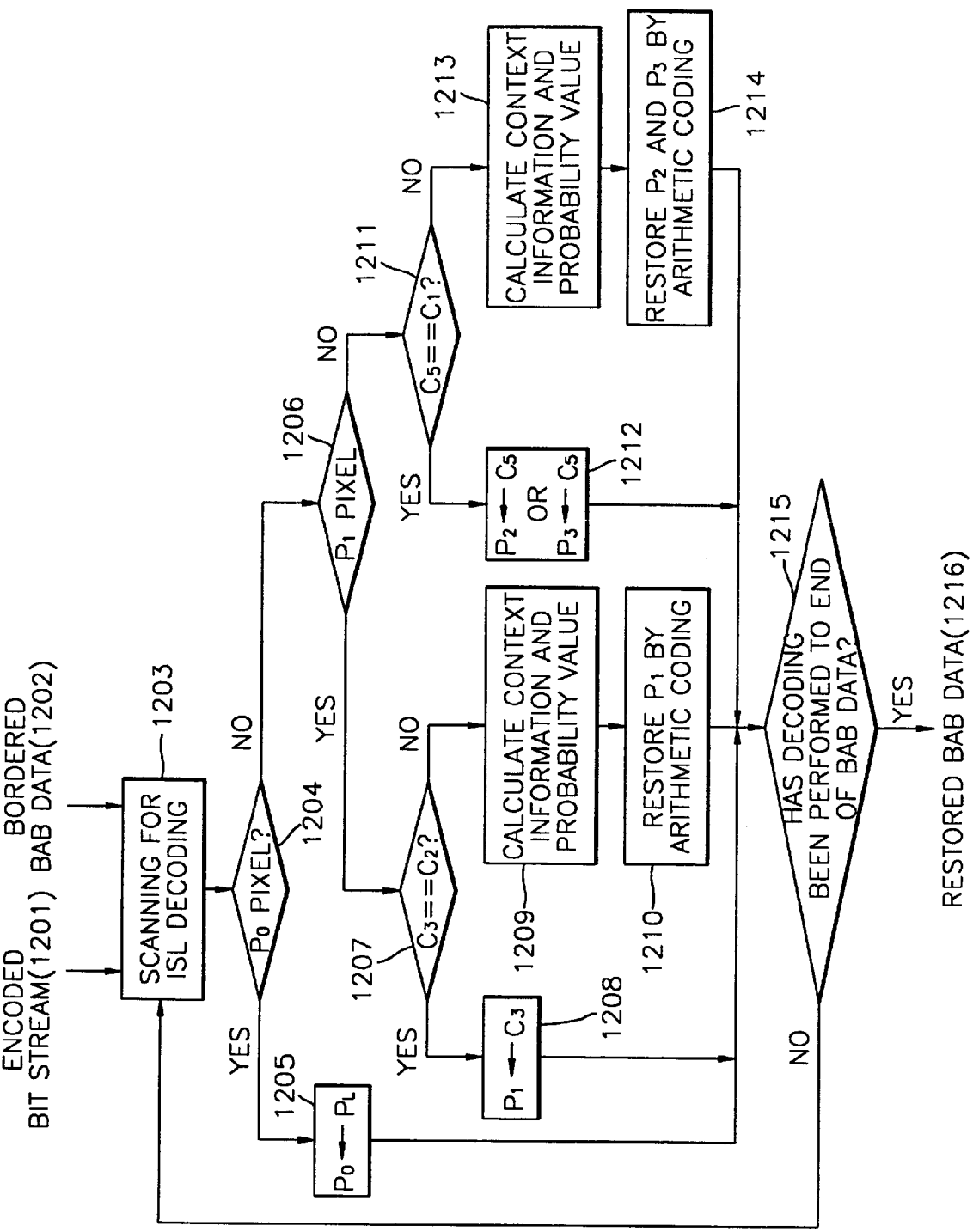
FIG. 12 is a flowchart showing a method of ISL decoding a binary alpha block.
Figure 14:
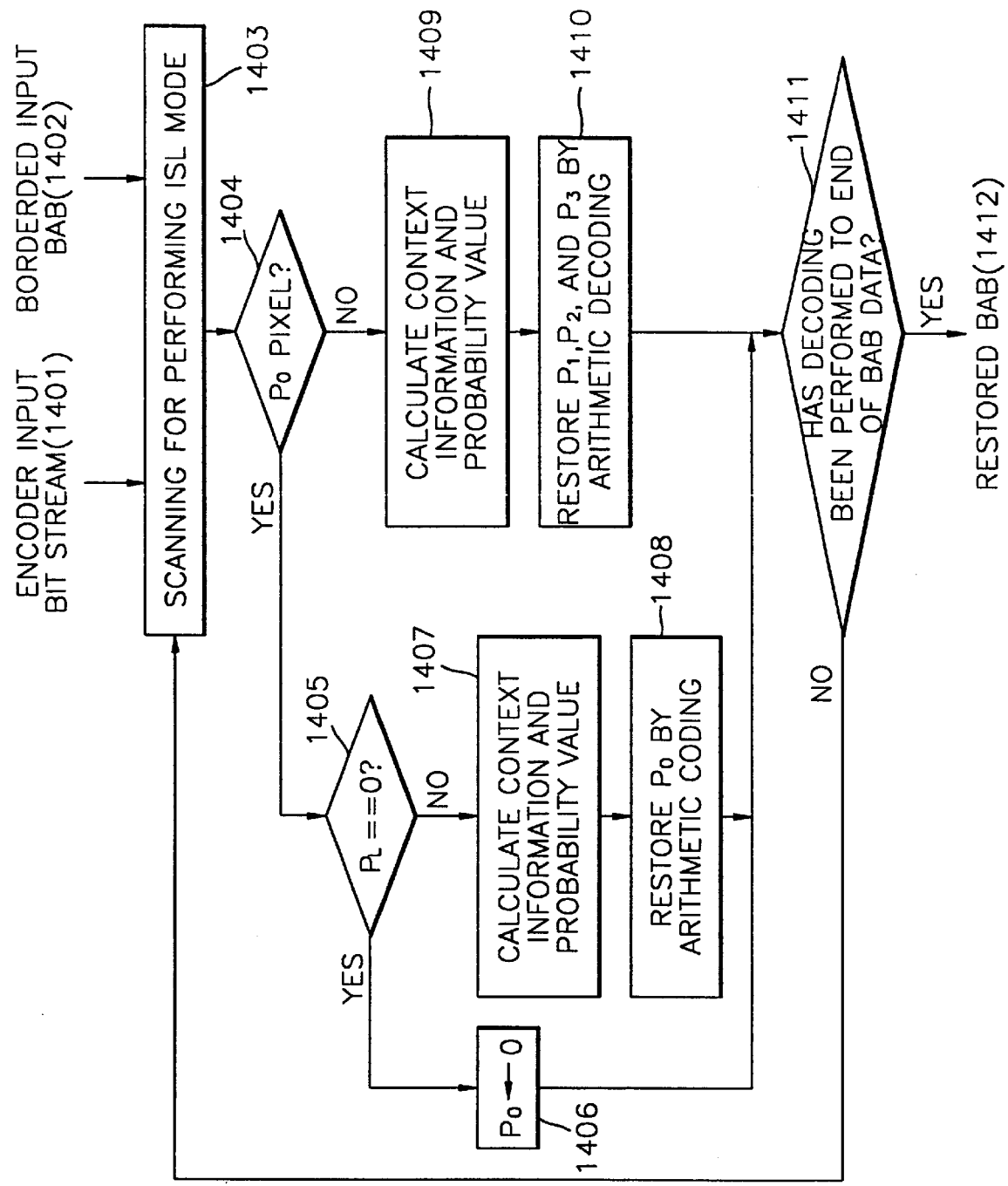
FIG. 14 is a flowchart showing a method of RSL decoding a binary alpha block.

Referring to FIG. 4, a scalable shape encoding process consists of processes of wavelet transforming the shape information, sequentially encoding the transformed low frequency band shape information of each layer from shape information of low resolution, and outputting a bit stream. The process of scalably encoding the shape information performed in units of a block includes the steps of receiving bordered binary alpha blocks (BAB) shown in FIG. 9A, determining which encoding mode to use according to the possibility of using exclusive-OR information of each pixel in a block, obtaining context information of pixels in a block and performing arithmetic coding on the pixels in a block according to the determined encoding mode. When the determined encoding mode is an interleaved scan-line (ISL) encoding method, the context information of the pixels in a block is obtained and arithmetic coding is performed on the pixels in a block in an interleaved scan-line order as shown in FIG. 12. When the encoding mode is a raster scan-line (RSL) encoding method, the context information of the pixels in a block is obtained and the arithmetic coding is performed on the pixels in a block in a raster scan-line order as shown in FIG. 14.

Figure 5:
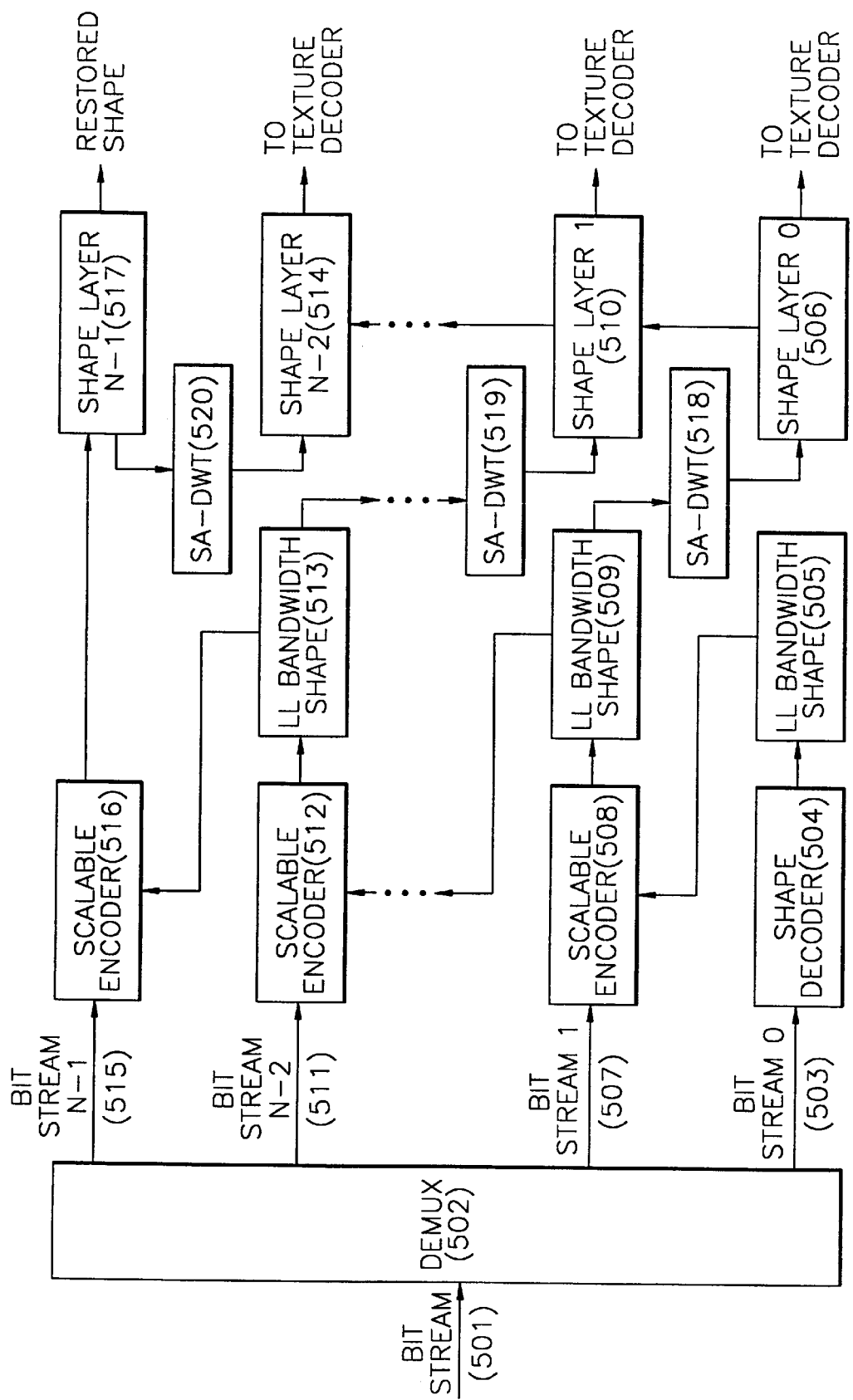
FIG. 5 is a block diagram showing the structure of a scalable shape decoder using wavelet transformation.
Figure 13:
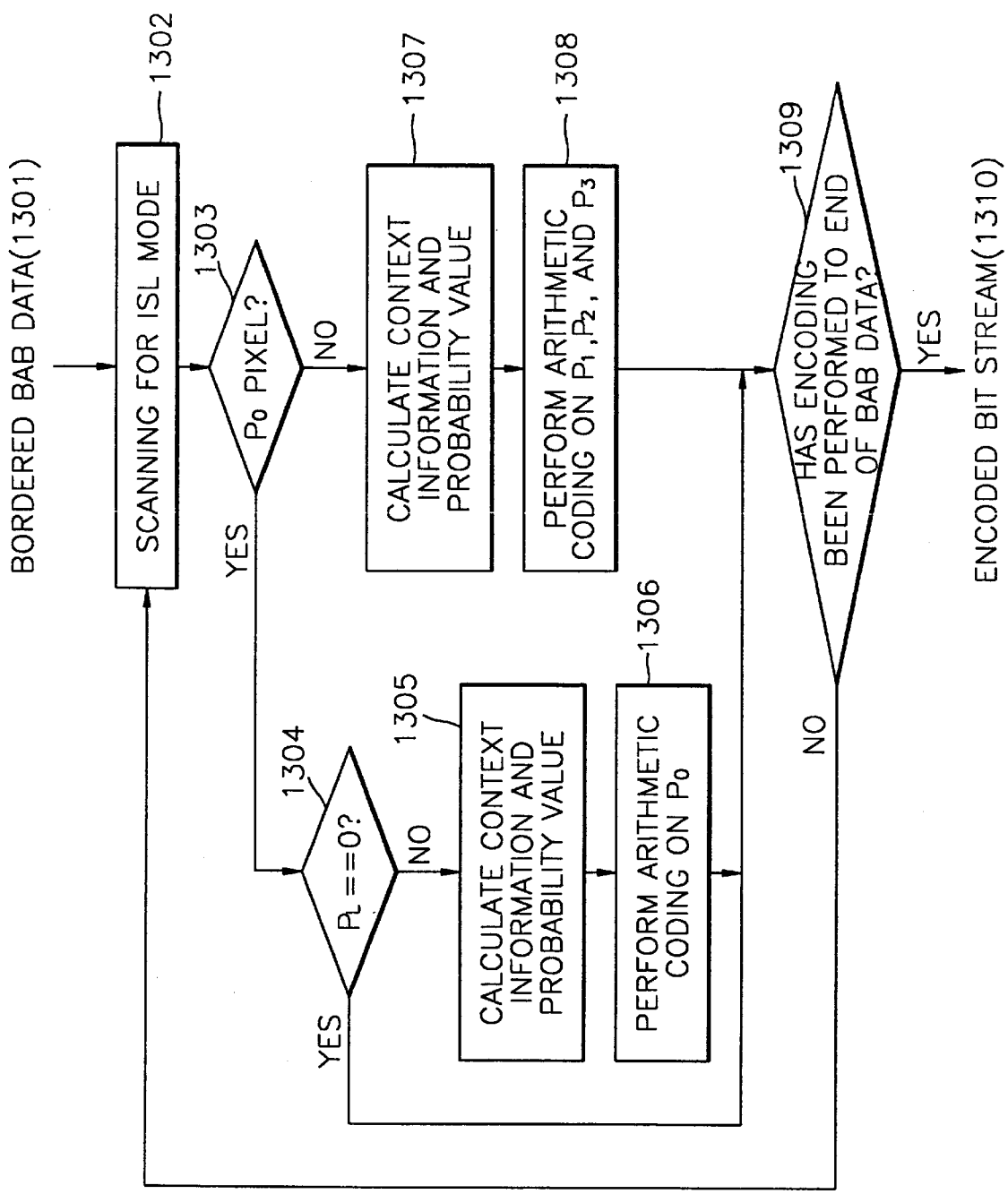
FIG. 13 is a flowchart showing a method of raster scan-line (RSL) encoding a binary alpha block.

Referring to FIG. 5, a scalable shape decoding process consists of processes of receiving an encoded bit stream, sequentially scalably decoding the encoded bit stream from a base layer, obtaining low frequency shape information of each layer, and obtaining wavelet transformed shape information and a restored shape for the restoration of texture information from the restored low frequency bandwidth. A process of scalably decoding the binary alpha block performed in units of a block includes the steps of re-constructing the encoded input bit stream shown in FIG. 9A to the bordered binary alpha block (BAB), obtaining the context information of the pixels in a block and performing arithmetic decoding on the pixels in a block according to the encoding mode. When the encoding mode is the ISL encoding method, the context information of the pixels in a block is obtained in the ISL order and arithmetic decoding is performed on the pixels in a block, as shown in FIG. 13, thus restoring the pixels. When the encoding mode is the RSL encoding method, the context information of the pixels in a block is obtained and arithmetic decoding is performed on the pixels in a block in the RSL order, as shown in FIG. 14.

With regard to a large input image, when a user desires to quickly restore not the entire image but a specific part of an image not by the entire encoded data but by some of the encoded data with a small amount of calculation, it is necessary to divide the shape and texture information into tiles and to independently encode and decode the respective tiles.

Figure 17A:
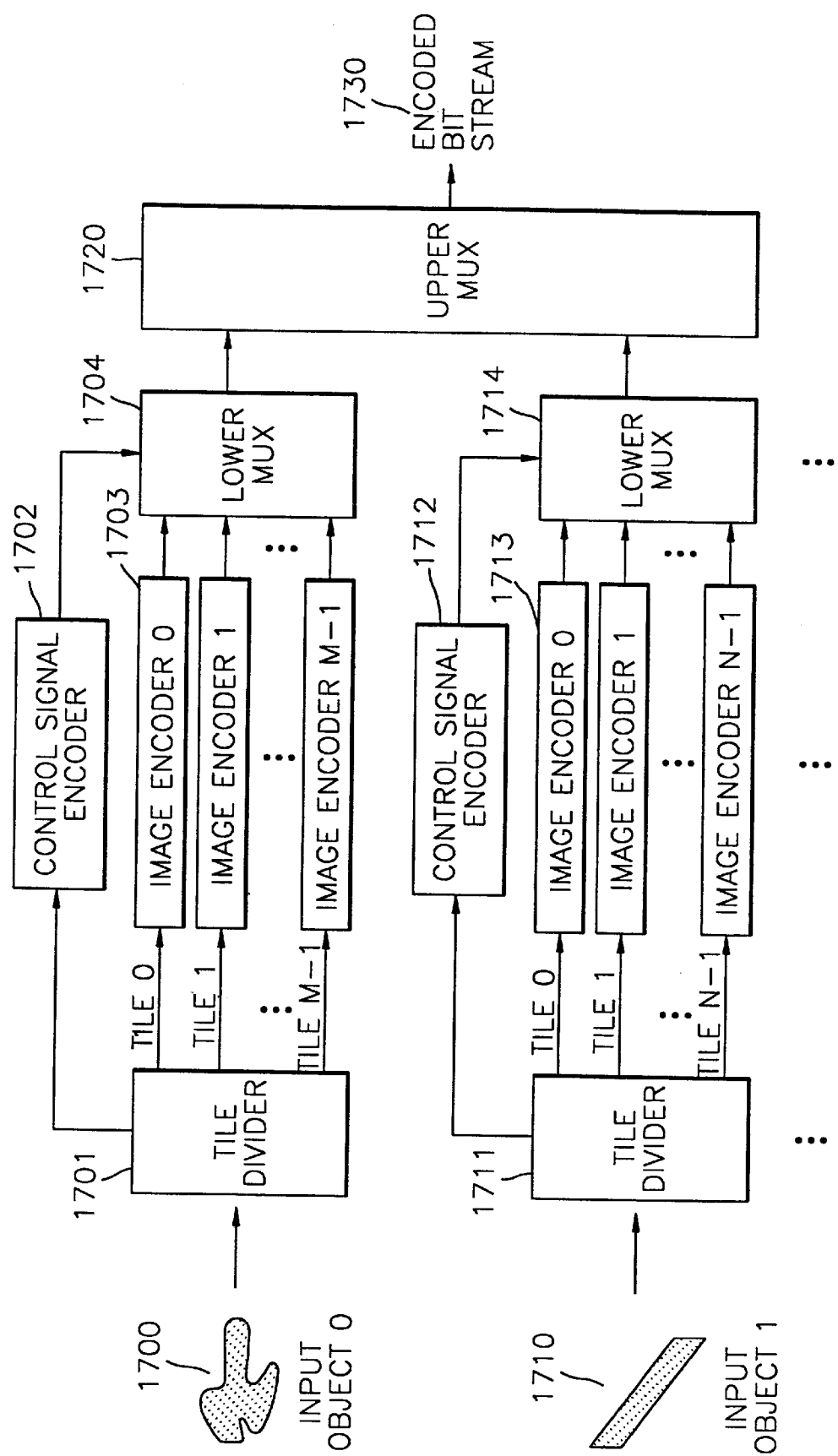
FIGS. 17A and 17B are block diagrams showing an object-based still image encoder and an object-based still image decoder, respectively, each of which uses a tile operation.

FIG. 17A is another embodiment of a scalable encoder for producing a still image using wavelet transformation according to the present invention, showing the structure of an object-based still image encoder which uses a tile operation, for dividing the still image into tiles and encoding the divided tiles using the scalable encoder of the still image shown in FIG. 1A. Referring to FIG. 17A, a plurality of tile dividers 1701 and 1711 divide one or more input objects 1700 and 1710 into tiles. Control signal encoders 1702 and 1712 encode the control signal generated by the tile dividers 1701 and 1711. The size of tiles divided by the tile dividers 1701 and 1711 is divided by 2 with the remainder 0. Also, the size of tiles divided by the tile dividers 1701 and 1711 is divided by 2×(N+1) in the horizontal and vertical directions when the number of layers of wavelet transformation is N for resolution scalability. Scalable encoders 1703 and 1713 shown in FIG. 1A encode tiles (tile 0, tile 1, . . . , and tile M−1 or tile 0, tile 1, . . . , and tile N−1) divided by the corresponding tile dividers 1701 and 1711. Encoded bit streams of each input object are sequentially connected to each other by lower multiplexers 1704 and 1714. An upper multiplexer 1720 obtains an encoded bit stream 1730 with respect to all input objects and transmits the encoded bit stream.

Figure 17B:
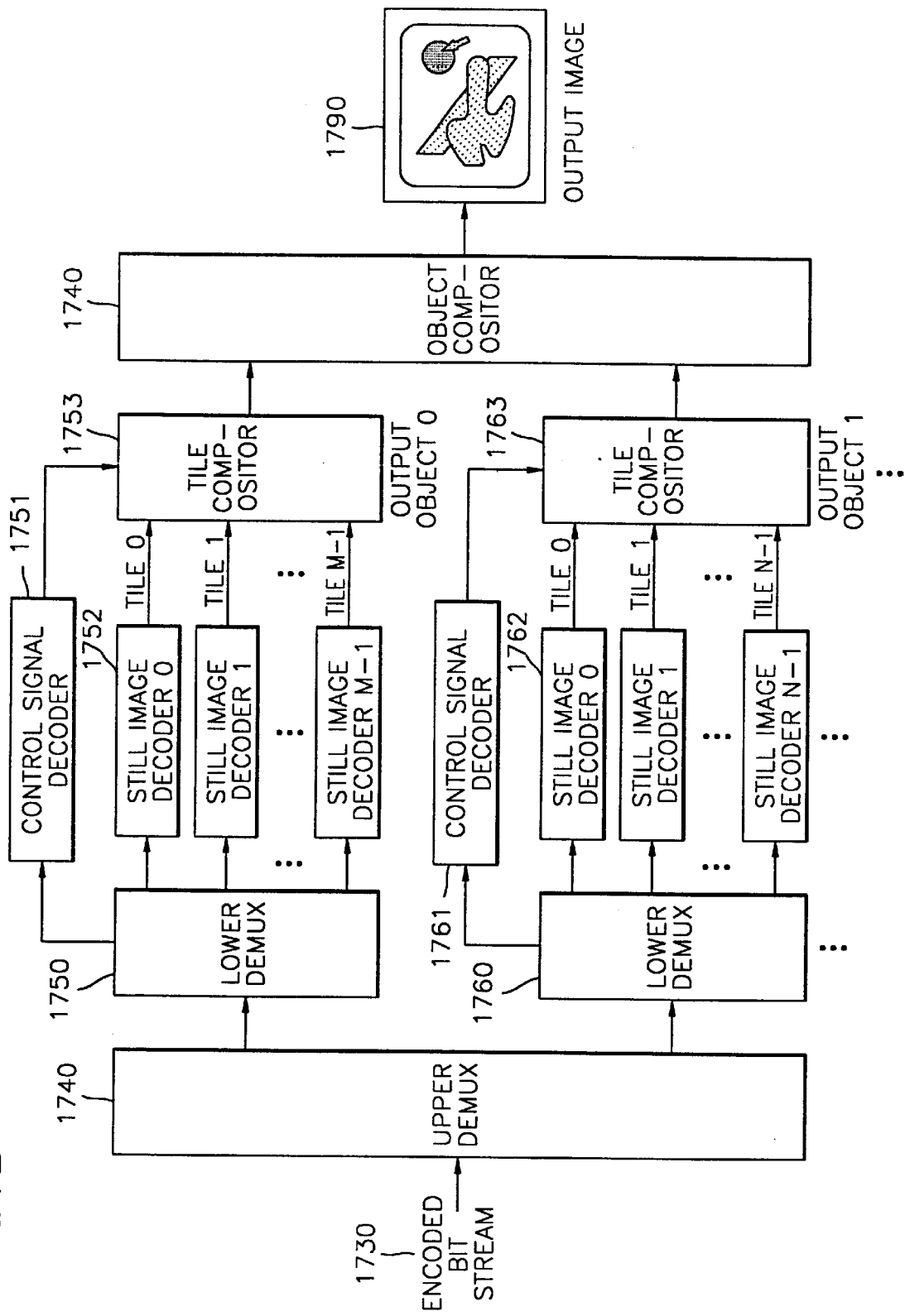

FIG. 17B shows inverse processes shown in FIG. 17A. The structure of the object-based still image decoder including the tile operation of decoding the specific part of an image with a small amount of calculation using a part of the encoded bit stream is shown. Referring to FIG. 17B, an upper demultiplexer 1740 divides the received bit stream 1730 into encoded objects. A plurality of lower multiplexers 1750 and 1760 divide the bit stream of each object into a control signal component and a plurality of tile components. Control signal decoders 1751 and 1761 receive the control signal component from the lower multiplexers 1750 and 1760, respectively, and decode the received control signal components. A plurality of scalable encoders 1752 and 1762 shown in FIG. 1B receive tile components from the lower multiplexers 1750 and 1760, respectively, and decode the received tile components. A plurality of tile compositors 1753 and 1763 reconstruct a corresponding object using tile components (tile 0, tile 1, . . . , and tile M−1, or tile 0, tile 1, . . . , and tile N−1) and a control component from the corresponding scalable encoders 1752 and 1762. An object compositor 1780 composes a plurality of objects composed by the tile compositors 1753 and 1763 to obtain a final output image 1790.

Hereinafter, the operating principle of the present invention will be described.

FIG. 1A shows the structure of a still image encoder using wavelet transformation.

As shown in FIG. 1A, when Shape_enable 102 is on, shape information of the luminance (Y) component of an input image 101 is scalably encoded and texture information of the luminance (Y) component is encoded in a wavelet domain using the shape information wavelet transformed by the luminance (Y) shape scalable encoder 103. When Shape_enable 102 is off, only texture information is encoded without the shape information.

The texture information on the chrominance (UV) component is always encoded. It is determined whether the shape information of the chrominance (UV) information is encoded by a condition; Shape_enable & Chroma_shape_enable 105. When the condition is satisfied, the shape and texture information of the chrominance (UV) component is padded and the padded shape information of the chrominance (UV) component is scalably encoded. The condition, Shape_enable & Chroma_shape_enable 105, is satisfied when the shape information of the chrominance (UV) component is required to be encoded since the input image has an arbitrary shape and the wavelet filter included in the scalable encoders 103 and 107 is an odd symmetry filter. When the wavelet filter included in the scalable encoders 103 and 107 is an even symmetry filter, it is not necessary to encode additional shape information since it is possible to obtain the shape information of the chrominance (UV) component from the shape information of the luminance (Y) component of each layer.

An encoded bit stream 110 is restored as shown in FIG. 1B. When the encoded bit stream 110 is input through a demultiplexer 111, the shape information of the luminance (Y) component is scalably decoded according to a condition; Shape_enable 112, and the texture information on the luminance (Y) component is decoded in the wavelet domain using the shape information of the decoded luminance (Y) component. When the condition, Shape_enable 112, is not satisfied, only the texture information is decoded without the shape information.

The texture information of the chrominance (UV) component is always decoded. It is determined whether the shape information of the chrominance (UV) component is decoded by a condition; Shape_enable & Chroma shape_ enable 115. When the condition is satisfied, the shape information of the chrominance (UV) component is scalably decoded. Decoded shapes from the respective layers are used for decoding the texture information. The condition, Shape_enable & Chroma_shape_enable 115, is the same as the condition, Shape_enable & Chroma_shape_enable 105.

FIG. 2 shows processes of padding the shape and texture information of the chrominance (UV) component of FIG. 1A. When an original image 201 is input, the shape information of the luminance (Y) component is 4:1 downsampled (step 202) and the downsampled shape information is extended to blocks (step 204). The length of one side of a block is B=2$^{(scal\_level-1)}$. Here, scal_level denotes the number of scalable layers. FIG. 3A shows an example of extension to blocks. Downsampled shape information 301 in FIG. 3A is extended by a region 302 divided into blocks. In the case of the extended shape information on the chrominance (UV) information, there is no texture information in a region between the downsampled shape information 301 and the extended region 302. In order to compensate for this, as shown in FIG. 2, region-based horizontal and vertical padding (steps 206 and 207) is performed using the shape information of the chrominance (UV) component extended in the step 204, the shape information of the chrominance (UV) component 203 downsampled in the step 202, and the texture information on the input chrominance (UV) component 205. Accordingly, padded UV shape information and texture information 208 is obtained.

Padding is performed in order to compensate for a position where there is no texture information, by using the texture information of an adjacent position. Referring to FIG. 3B, when there are an original chrominance (UV) component image 303 and an extended image 304, the texture information of the region B 306 is padded in horizontal and vertical directions using the texture information of the border of the region A 305 shared by the two regions. The reference of the texture information is shown by arrows in FIG. 3B. The process of repetitive padding in a horizontal direction is given in detail as follows.

```
for (y=0; y<M; y++) {
    for (x=0; x<N; x++) {
        if (ref_shape[y][x] == '1') {
            if (s[y][x] == 1) { hor_pad[y][x] = d[y][x]; s'[y][x]=1; }
            else {
                if (s[y][x']==1 && s[y][x"]==1) {
                    hor_pad[y][x] = (d[y][x']+ d[y][x']) // 2;
                    s'[y][x]=1;
                } else if (s[y][x']==1) {
                    hor_pad[y][x] = d[y][x']; s'[y][x] = 1;
                } else if (s[y][x']==1) {
                    hor_pad[y][x] = d[y][x"]; s'[y][x]=1;
                }
            }
        }
    }
}
```

Here, ref_shape[] [], s[] [], d[] [], and hor_pad[] [] respectively denote an extended shape information value, shape information downsampled from the shape information of the chrominance (UV) information, texture information, and an image value obtained after performing padding in the horizontal direction. x' denotes the effective pixel position (s[y][x']==1) closest to, and to the left of the current position x. x" denotes the effective pixel position closest to, and to the right of the current position x. M and N denote the width and height of an image.

When a pixel value exists only on the left (or on the right) of the current position, the value is used as the pixel value of the current position. When pixel values exist on the left and right of the current pixel, the mean value of the two values is used as the pixel value of the current position. The process of repetitive padding in a vertical direction is as follows.

```
for (x=0; x<N; x++) {
    for (y=0; y<M; y++) {
        if (ref_shape[y][x]=='1') {
            if (s'[y][x]==1) hv_pad[y][x] = hor_pad[y][x];
            else {
                if (s'[y'][x]==1 && s'[y"][x]==1) {
                    hv_pad[y][x] = (hor_pad[y'][x] + hor_pad[y"][x]) // 2;
                } else if (s'[y'][x]==1) {
                    hv_pad[y][x] = hor_pad[y'][x];
                } else if (s'[y"][x]==1) {
                    hv_pad[y][x] = hor_pad [y"][x];
                }
            }
        }
    }
}
```

Here, s'[] [] and hv_pad [] [] represent the shape information obtained by extending the shape information obtained by downsampling the shape information of the luminance (Y) component in a horizontal direction and the image value obtained after performing padding in a vertical direction, respectively. y' denotes the effective pixel position (s'[y'][x]==1) closest to, and above the current position y. y" denotes the effective pixel position closest to, and below the current position y.

FIG. 4 shows the structure of the scalable encoder of the shape information using wavelet transformation. An input image 401 obtains a shape pyramid from the respective layers 402, 404, 406, and 408 through shape adaptive discrete wavelet transformations (SA-DWT) 403, 405, and 407. The wavelet transformed shape information items 404, 406, and 408 of the respective layers are input to the texture wavelet encoders 104 and 108 of FIG. 1A and are used for encoding the texture information from each layer. Low frequency bandwidth shape information 409 of the lowest layer 408 is encoded through a general shape encoder 410. A context-based arithmetic encoder (CAE) can be used as the shape encoder. Low frequency bandwidth shape information items 412 and 415 of the shape layers 406 and 404 excluding the uppermost layer and the lowermost layer and the most upper layer shape information item 402 are encoded by scalable encoders 413, 416, and 418 provided in the present invention using the low frequency bandwidth shape information items 409, 412, and 415 of the lower layers of the respective layers. Bit streams 411, 414, 417, and 419 encoded in the respective layers are formed into a bit stream 421 from the lower layer to the upper layer by a multiplexer 420 and the bit stream 421 is sent to a channel.

FIG. 5 shows the structure of the scalable decoder of the shape information using wavelet transformation. An encoded bit stream 501 is divided into bit streams of lower layers and bit streams of upper layers. The bit stream 503 of the lowest layer is used for obtaining a shape 505 of a low frequency bandwidth through a general shape decoder 504. Bit streams 507, 511, and 515 of upper layers are used for obtaining low frequency bandwidths 509 and 513 of the respective layers or shape information 517 of the most upper layer through scalable decoders 508, 512, and 516. Scalable decoders 508, 512, and 516 of the respective layers receive the encoded bit streams corresponding to the respective layers and low frequency bandwidth shape information items 505, 509, and 513 of lower layers. In order to restore shape information wavelet transformed in each layer, the low frequency bandwidth shape information items 509 and 513 of the upper layers of the respective layers and the shape information 517 of the most upper layer are shape adaptive wavelet transformed 518, 519, and 520 and restored shapes 506, 510, and 514 of the respective layers are obtained using LL, LH, HL, and HH bandwidth information items of the SA-DWT 518, 519, and 520. The restored shapes 506, 510, and 514 of the respective layers are input to the texture wavelet decoders 114 and 117 of FIG. 1B and are used for restoring texture components.

Figure 6:
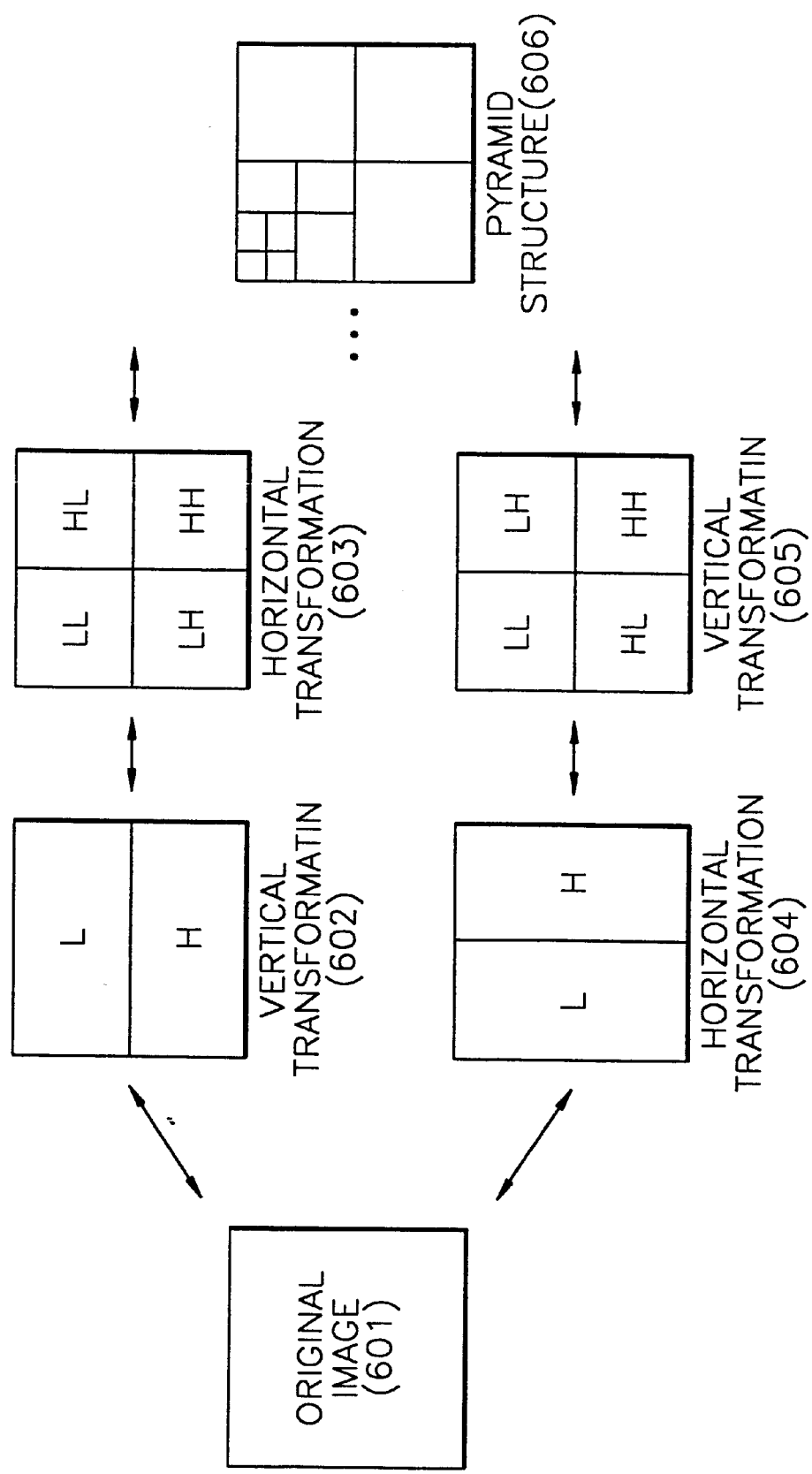
FIG. 6 describes a method of forming an image pyramid to which one dimensional wavelet is applied.

FIG. 6 describes processes of forming the pyramid of the shape information using one-dimensional wavelet transformation and inverse processes. The method of one-dimensionally dividing the shape information varies according to the type of wavelet transformation filter. When the wavelet transformation is an odd symmetry filter, the even numbered pixel values of an input signal are sampled with low frequency bandwidth and odd numbered pixel values are sampled with high frequency bandwidth. When shape information of one pixel length is received and the pixel is odd numbered, the pixel of the low frequency bandwidth is exchanged with the pixel of the high frequency bandwidth.

When the wavelet transformation filter is an even symmetry filter, the even numbered pixel values of the received signal are sampled with a low frequency bandwidth and odd numbered pixel values are sampled with a high frequency bandwidth, like in the odd symmetry filter. When the starting point of a segment where a successive pixel value is 1 is odd numbered, the signal of the high frequency bandwidth at the starting point is exchanged with the signal of the low frequency bandwidth. Namely, an effect of performing an OR operation between low frequency information items of the respective layers is created.

An input image 601 is divided into a low frequency (L) bandwidth and a high frequency (H) bandwidth by performing a one-dimensional transformation 602 in a vertical direction. When a transformation 603 is performed in each bandwidth in a horizontal direction, the low frequency (L) bandwidth is divided into a low frequency-low frequency (LL) bandwidth and a high frequency-low frequency (HL) bandwidth. The high frequency (H) bandwidth is divided into a low frequency-high frequency (LH) bandwidth and a high frequency-high frequency (HH) bandwidth. Accordingly, the input image is divided into four bandwidths. When this process is repeatedly performed in the low frequency-low frequency (LL) bandwidth, a pyramid structure 606 of an image is obtained. It is possible to obtain an image having four bandwidths by performing a transformation 604 in a horizontal direction and then, performing a transformation 605 in a vertical direction.

Figure 7:
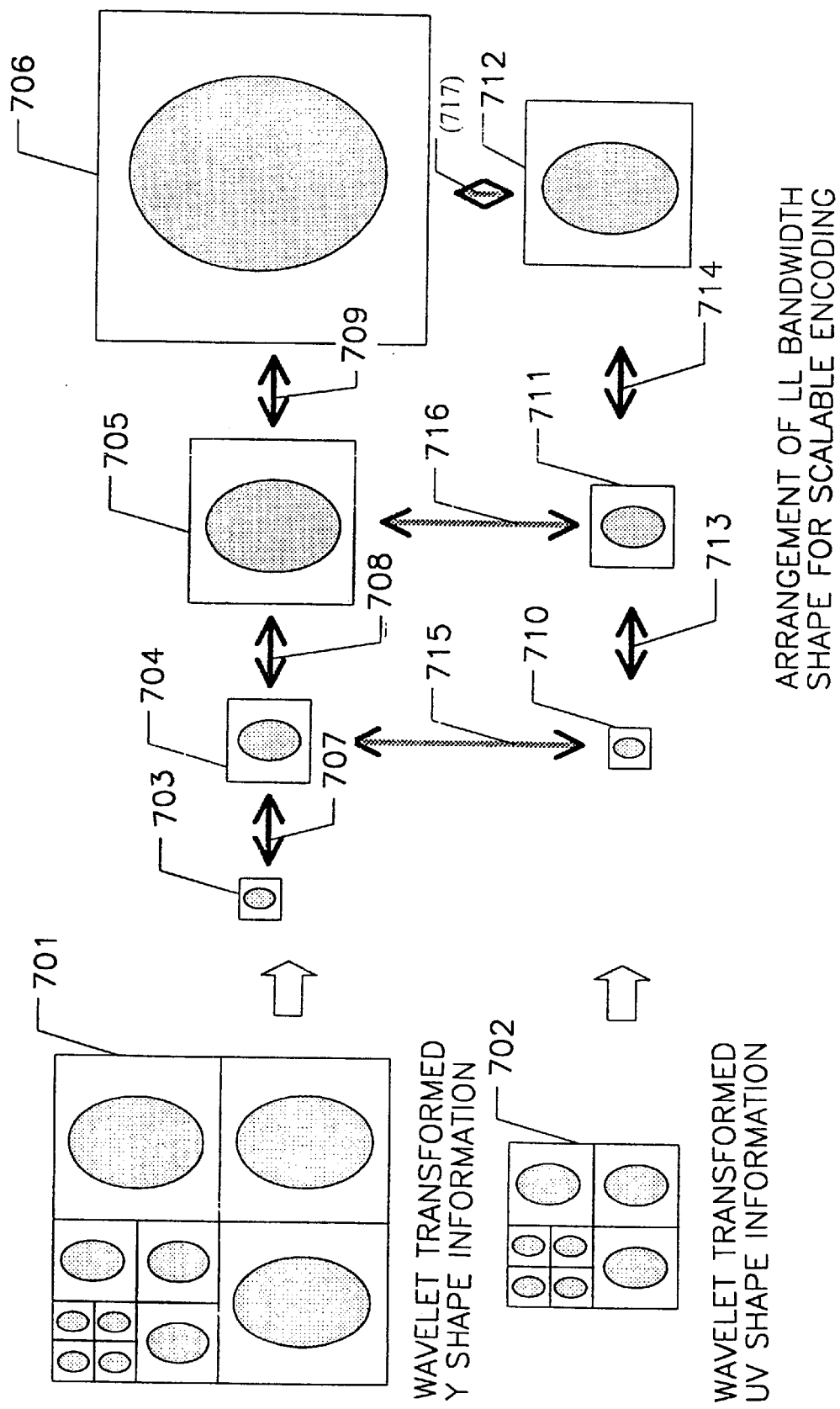
FIG. 7 illustrates three-layered scalable shape coding.

FIG. 7 illustrates three layered scalable shape coding processes with respect to an image of a 4:2:0 format. In FIG. 7, reference numerals 701 and 702 respectively denote the wavelet pyramid image of a luminance (Y) component divided into three layers and the wavelet pyramid image of a chrominance (UV) component divided into two layers. The number of layers of the chrominance (UV) component image is smaller than the number of layers of the luminance (Y) component image by one since the size ratio of the chrominance (UV) component image to the luminance (Y) component image is 4:1.

It is possible to obtain LL bandwidth images 703, 704, 705, and 706 of the respective layers from the wavelet pyramid image 701 of the luminance (Y) component. Also, it is possible to obtain LL bandwidth images 710, 711, and 712 of the respective layers from the wavelet pyramid image 702 of the chrominance (UV) component. A scalable encoder and decoder sequentially encodes and decodes the LL bandwidth shape information from the lower layer. The lowest shape information items 703 and 710 of the respective pyramids are encoded by a general shape encoder. The shape information items 704, 705, 706, 711, and 712 of the upper layers are scalably encoded using the shape information items 703, 704, 705, 710, and 711 of the lower layers of the respective layers, which is denoted as reference numerals 707, 708, 709, 713, and 714.

When the wavelet transformation filter is an even symmetry filter, wavelet transformations 707, 708, 709, 713, and 714 between the layers can be expressed by an OR operation. Therefore, when the shape information 712 on the chrominance (UV) component is downsampled through the OR operation from the shape information 706 of the uppermost layer of the luminance (Y) component, the shape information items 703, 704, and 705 of the luminance (Y) component of the respective layers are the same as the shape information 710, 711, and 712 on the chrominance (UV) component. The chrominance (UV) components downsampled in the ratio of 4:1 with respect to the luminance (Y) components of the respective scalable layers are correctly one-to-one matched 715, 716, and 717 to the luminance (Y) components. Accordingly, no visual problem is caused. In this case, scalable shape encoding with respect to the chrominance (UV) component is not required. Therefore, in this case, the conditions, Shape_enable & Chroma_shape_enable 105 and 115 become 0 in FIGS. 1A and 1B, and the shape information of the chrominance (UV) component is not encoded.

When the wavelet transformation filter is an odd symmetry filter, the wavelet transformations 707, 708, 709, 713, and 714 between the layers are not OR operations. Therefore, when the shape information 712 of the chrominance (UV) component of the most upper layer is downsampled by the OR operation from the shape information 706 of the luminance (Y) component, since some values of the shape information items 710 and 711 of the chrominance (UV) component downsampled in the ratio of 4:1 may not exist in the shape information items 704 and 705 of the luminance (Y) component, the color component of the border of the shape fades. In order to reduce this effect, when the image of the most upper layer of the chrominance (UV) component is obtained, the shape information obtained by downsampling the shape information of the luminance (Y) component by the OR operation is extended to blocks according to the number of layers, the texture component is obtained by performing horizontal and vertical padding, and then the shape information of the chrominance (UV) component is encoded.

Figure 8A:
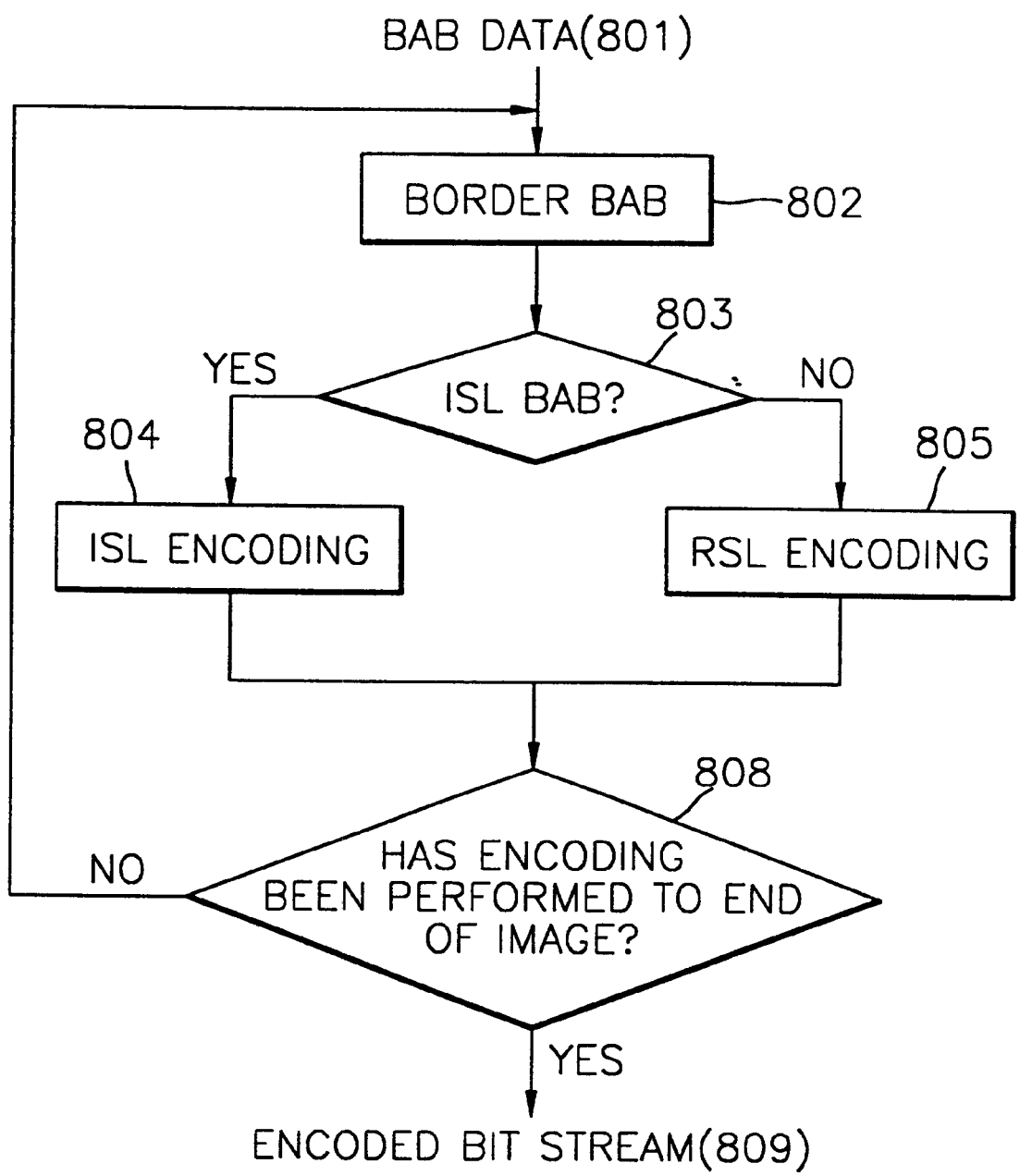
FIGS. 8A and 8B describe methods of scalable coding/decoding in units of a binary alpha block.
Figure 8B:
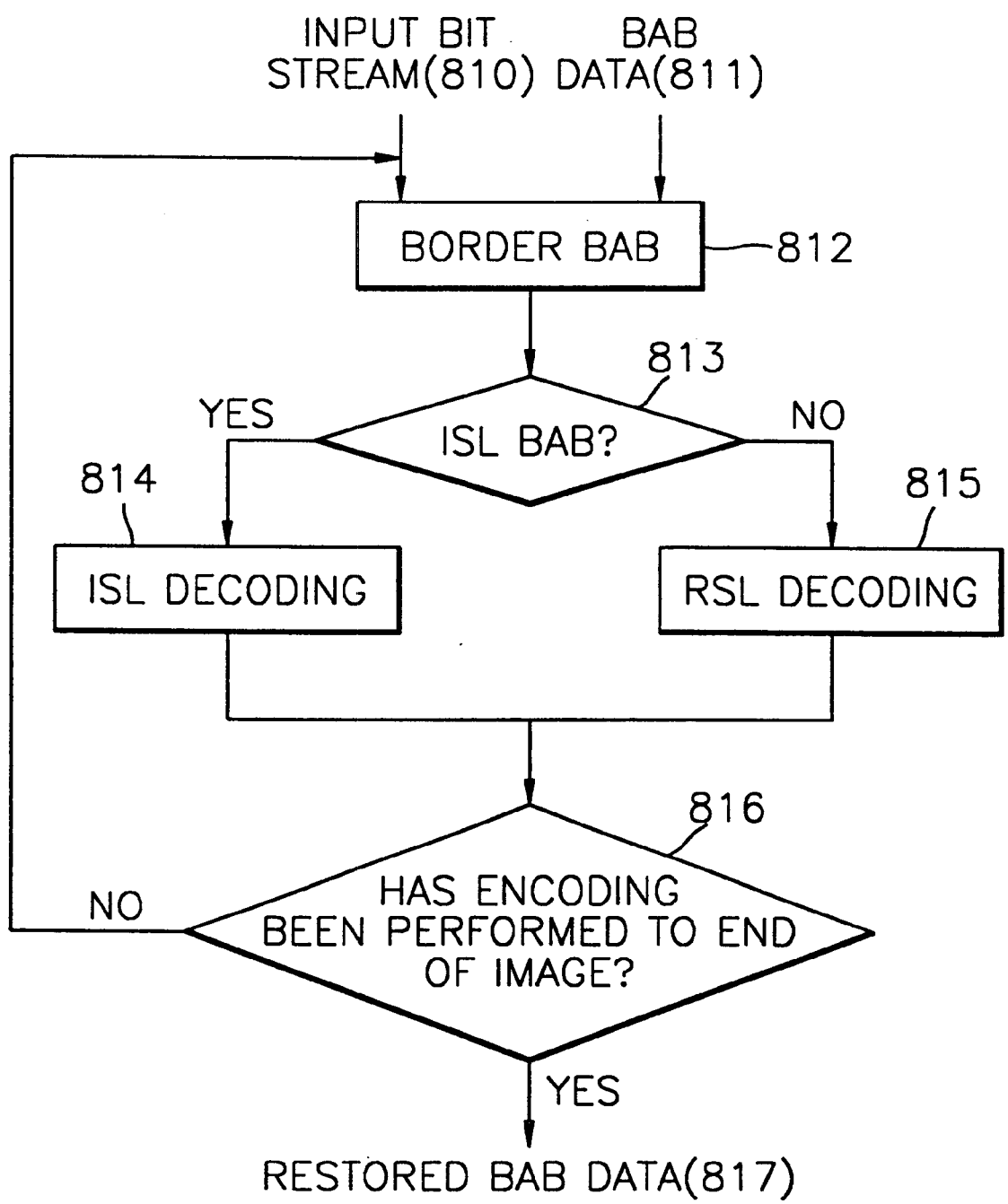

FIGS. 8A and 8B are flowcharts describing scalable shape encoding and decoding methods in units of a block. Referring to FIG. 8A, a binary alpha block (BAB) data 801 is bordered (step 802). An encoding mode is determined (step 803). When the encoding mode is the ISL encoding mode, the ISL coding is performed (step 804). When the encoding mode is not the ISL encoding mode, RSL coding is performed (step 805). In the ISL mode, a pixel is encoded using the correlation between the pixel to be encoded and left and right or top and bottom pixels. In the RSL mode, correlation between a pixel to be encoded and pixels of lower layers is used. After encoding the BAB data, after the pixel encoding has been performed to the end of the image, the pixel coding is terminated and the encoded bit stream 809 is output. When the pixel coding has not been performed to the end of the image, the steps after the step 802 are performed again with respect to next BAB data (step 808).

FIG. 8B shows processes inverse to the processes of FIG. 8A. A border is set around BAB data to be restored by receiving the bit stream 810 encoded in FIG. 8A and a lower layer or a previously restored BAB data 811 (step 812). The encoding mode is decoded (step 813). When the encoding mode is the ISL mode, the ISL decoding is performed (step 814). When the encoding mode is not the ISL mode, the RSL mode is performed (step 815). After decoding the BAB data, after the decoding has been performed to the end of the image, the decoding is terminated, thus obtaining restored shape information 817. When the decoding has not been performed to the end of the image, the processes after the step 812 are repeated after receiving a next input bit stream 810 (step 816).

Figures 9A, 9B, 9C:
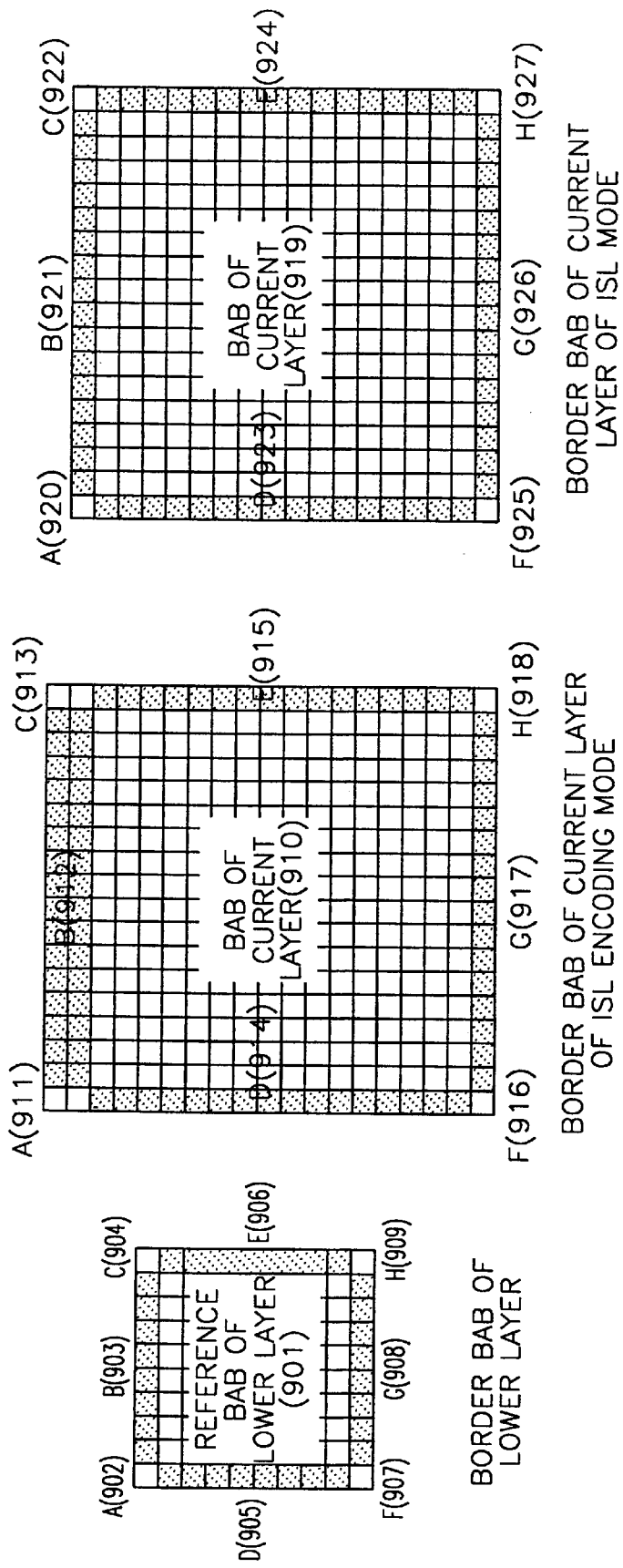
FIGS. 9A, 9B, and 9C illustrate the bordering of binary alpha blocks.

FIG. 9 describes processes of setting the border of the BAB of FIG. 8 in detail. In order to encode a pixel of a BAB, context information must be obtained with reference to pixels around the pixel to be encoded. However, the pixel on the border of the BAB may not have pixels for obtaining the context information. Therefore, a border region is set to the BAB before decoding the pixel. In FIG. 9A, the bordering of a 8×8 block of a lower layer is shown. Since all shape information items of lower layers exist, the values of pixels around the pixel on the border of the BAB are used as a 1×1 top-left border A 902, a 8×1 top border B 903, a 1×1 top-right border C 904, a 1×8 left border D 905, a 1×8 right border E 906, a 1×1 bottom-left border F 907, a 8×1 bottom border G 908, and a 1×1 bottom-right border H 909 of a BAB 901. At this time, when the values of the pixels around the pixel on the border of the BAB are outside the border of the input image, the values are determined to be 0.

FIG. 9B describes a method of setting a border region of a 16×16 BAB of a current layer for the ISL encoding mode. The values of the pixels restored in the previous shape block are used as a 1×2 top-left border A 911, a 16×2 top border B 912, a 1×2 top-right border C 913, and a 1×16 left border D 914 of a BAB 910. A 1×16 right border E 915 and a 16×1 bottom border G 917 of the BAB 910 are obtained by upsampling the 1×8 right border E 906 and the 8×1 bottom border G 908 of the lower layer BAB shown in FIG. 9A. Namely, the 1×16 right border E 915 and the 16×1 bottom border G 917 of the BAB 910 are obtained by simply repeating one pixel to two pixels when the borders are upsampled in the ratio of 1:2. The values of the 1×1 bottom-left border F 907 and the 1×1 bottom-right border H 909 of the lower layer are used as the values of the 1×1 bottom-left border F 916 and the 1×1 bottom-right border H 918 of the current layer.

FIG. 9C describes a method of setting a border region of the 16×16 BAB of the current layer for the RSL encoding mode. The values of the pixels restored in the previous BAB are used as a 1×1 top-left border A 920, a 16×1 top border B 921, a 1×1 top-right border C 922, and a 1×16 left border D 923 of a BAB 919, like in the ISL mode of FIG. 9B. The sizes of the border regions A 920, B 921, and C 922 in FIG. 9C are different from those in FIG. 9B. This is because the position of the context information of the ISL mode is different from the position of the context information of the RSL mode. A 1×16 right border E 924 and a 16×1 bottom border G 926 the BAB 919 are obtained by upsampling the 1×8 right border E 906 and the 8×1 bottom border G 908 of the BAB of the lower layer shown in FIG. 9A. The values of the 1×bottom-left border F 907 and the 1×1 bottom-right border H 909 are used as the values of a 1×1 bottom-left border F 925 and a 1×1 bottom-right border H 927.

Figure 10:
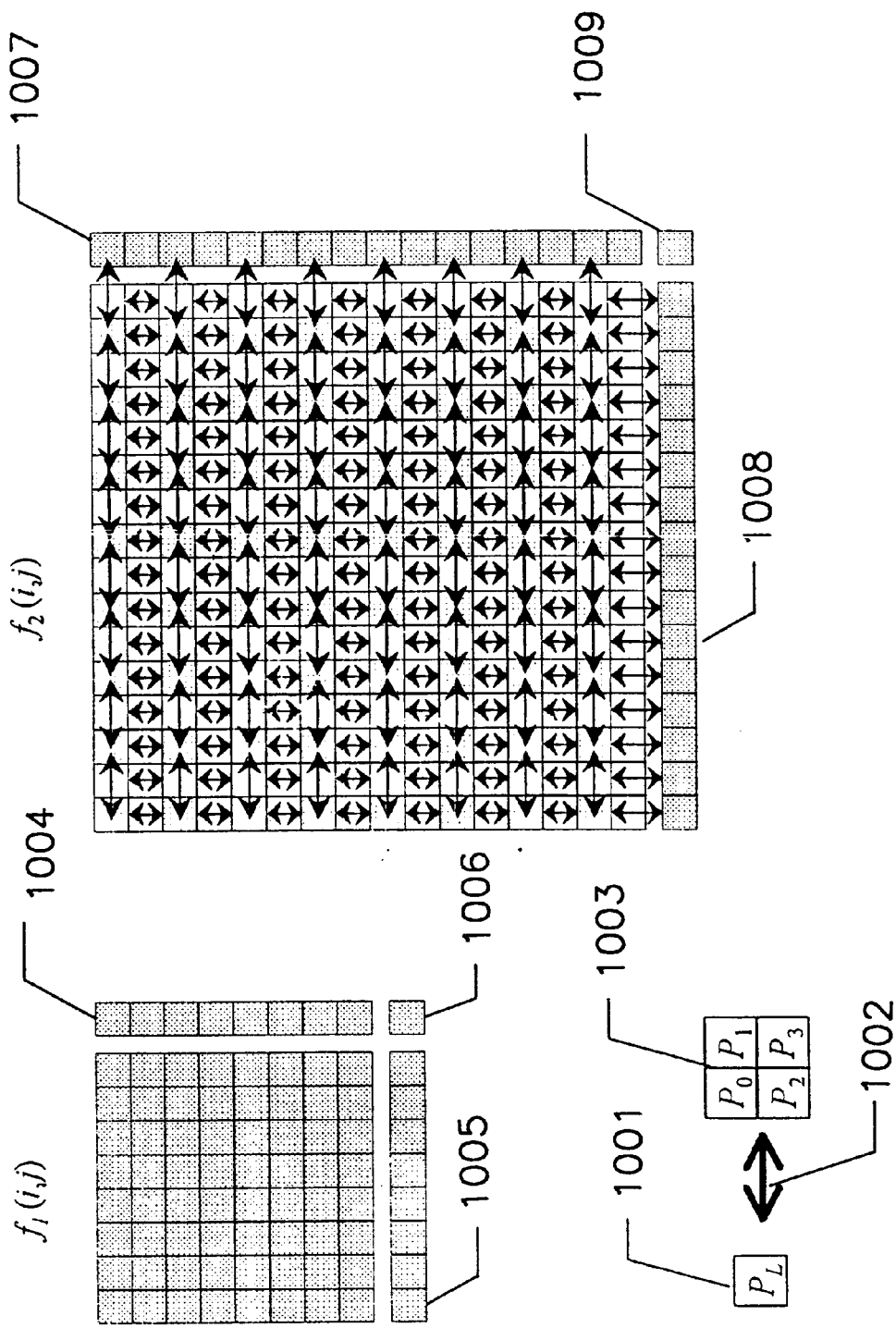
FIG. 10 describes conditions of determining the mode of encoding a binary alpha block.

FIG. 10 shows conditions of determining whether the encoding mode is the ISL method or the RSL method in the step 803 of FIG. 8 with respect to a BAB. The conditions must be checked using the BABs and the border regions of two layers as inputs. The 1×1 pixel $P_L$ 1001 of the BAB $f_1$ (i, j) of the lower layer corresponds 1002 to the 2×2 block of pixels $P_0, P_1, P_2, P_3$ 1003 of the BAB $f_2$ (i, j) of the current layer. Reference numerals 1007 and 1008 which denote the borders of the BAB $f_2$ (i, j) are obtained by repeatedly upsampling reference numerals 1004 and 1005 which denote the borders of the BAB $f_1$ (i, j). Reference numeral 1009 which denotes the border of the current layer is obtained from reference numeral 1006 which denotes the border of the lower layer. Equation 1 is checked in order to determine the encoding mode.

condition1=$(f_2(2i, 2j)==f_1(i, j))$ condition2=!(!$(f_2(2i, 2j)\oplus f_2(2i+2, 2j)$&&$(f_2(2i+1, 2j)!=f_2(2i, 2j))$ condition3=!(!$(f_2(2i, 2j)\oplus f_2(2i, 2j+2)$&&$(f_2(2i, 2j+1)!=f_2(2i, 2j))$ condition4=!(!$(f_2(2i+1, 2j)\oplus f_2(2i+1, 2j+2)$&&$(f_2(2i+1, 2j+1)!=f_2(2i+1, 2j))$ [Equation 1]

Here, ⊕ represents an exclusive OR operator and has the value of 1 when two operands are different to each other (1 and 0 or 0 and 1). The operator && represents an AND operator and the operator ! represents a NOT operator. When the four conditions of the Equation 1 are satisfied, the BAB is encoded in the ISL encoding mode. When the four conditions of the Equation 1 are not all satisfied, the BAB is encoded in the RSL encoding mode.

The Condition 1 is satisfied when the pixel $P_L$ is the same as the pixel $P_0$. Therefore, in the case of the ISL mode, $P_L$ is not encoded. In general, in the case of the shape information, there is a large correlation between the pixel to be currently encoded and left and right or top and bottom pixels. Therefore, when the left and right pixels of the pixel to be encoded have the same value or the pixels above and below the pixel to be encoded have the same value, there is a high probability that the values are equal to the value of the pixel to be encoded. The Conditions 2, 3, and 4 are for checking, whether the two adjacent pixels have the same value and the value of the pixel to be encoded in the BAB to be encoded is equal to the value of the two adjacent pixels. The Condition 2 is for checking whether the pixels to the left and right of the pixel $P_1$ to be encoded have the same value and the value is equal to the value of the pixel to be encoded. The Condition 3 is for checking whether pixels above and below the pixel $P_2$ to be encoded have the same value and the value is equal to the value of the pixel to be encoded. The Condition 3 is for checking whether the pixels above and below the pixel $P_3$ to be encoded have the same value and the value is equal to the value of the pixel to be encoded. Satisfying the Conditions 2, 3, and 4 means that $P_1$, $P_2$, and $P_3$ are encoded only when the left and right or top and bottom pixels have different values. It is possible to improve the coding efficiency in the ISL encoding mode by reducing the number of $P_0$, $P_2$, and $P_3$ to be encoded using the correlation between interleaved scan lines. The RSL encoding mode is used when the position of the pixel is changed into the low frequency bandwidth during the wavelet transformation and one or more conditions are not satisfied among the Conditions 2, 3, and 4. In this case, all the pixels $P_0$, $P_1$, $P_2$, and $P_3$ of the current layer are encoded using the values of the pixels of the lower layers. Encoding mode information is encoded using the arithmetic coding like in the pixel coding. The probability distribution of the arithmetic encoder for the BAB encoding mode is as follows.

Figure 11:
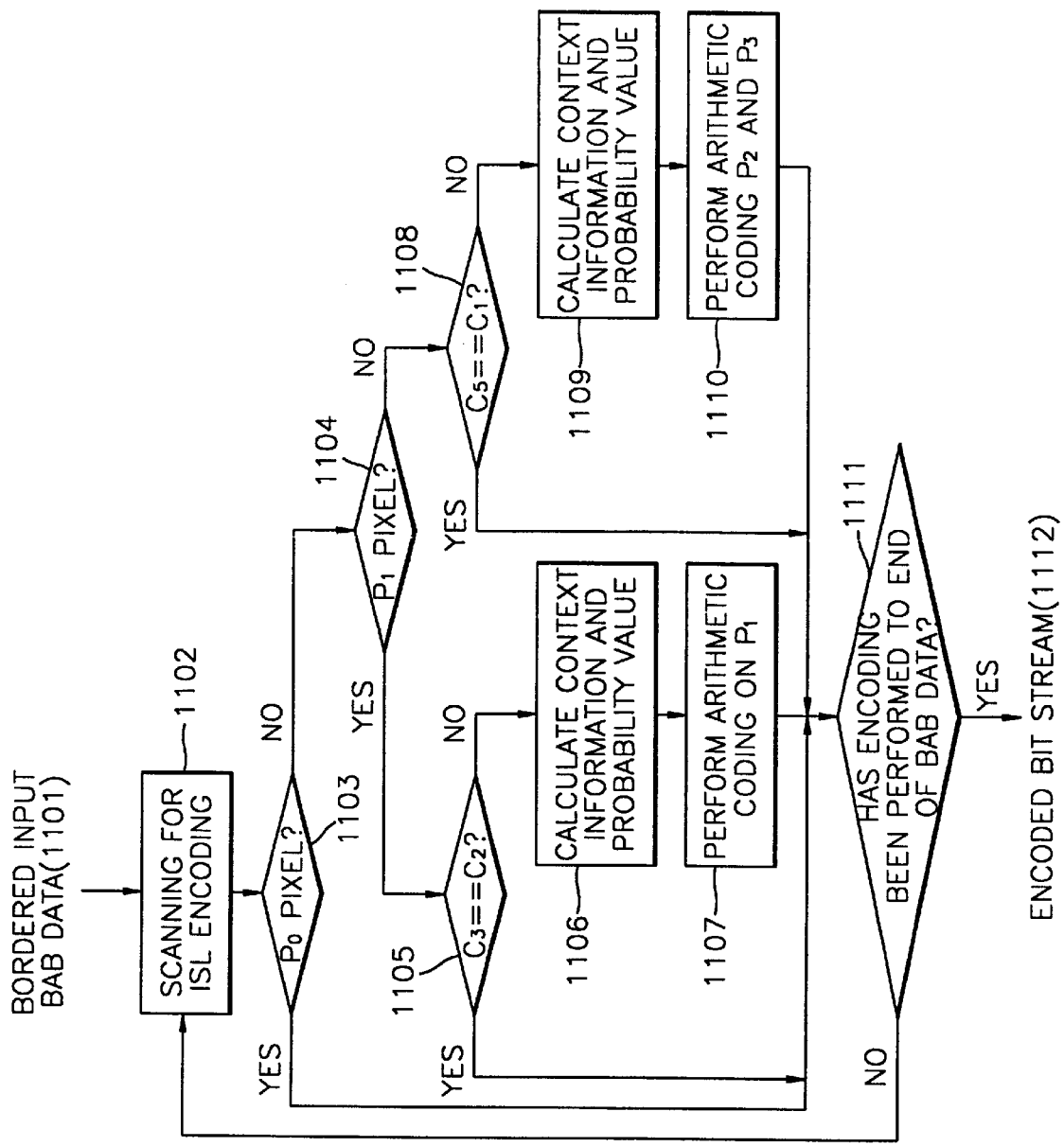
FIG. 11 describes a method of interleaved scan-line (ISL) encoding a binary alpha block.

Static unsigned int scalable_bab_type_prob[2]= {59808, 44651};

FIG. 11 is a flowchart describing an encoding method in the ISL mode. When BAB data 1101 bordered by the method of FIG. 9B is received, the respective pixels in the BAB are scanned in the encoding order of the ISL encoding mode (step 1102). The encoding order of the ISL encoding mode is shown in FIG. 15A. Considering the correlation between pixels of different layers such as the reference numeral 1002 of FIG. 10, $P_0$ is not encoded since $P_0$ is predicted to be $P_L$ and the value $P_1$ is encoded first. Then, $P_2$ and $P_3$ are sequentially encoded. Namely, when the value of the pixel to be encoded is the value of $P_0$ (step 1103), the pixel is not encoded. When the value of the pixel to be encoded is not the value of $P_0$, it is checked whether the value of the pixel to be encoded is the value of $P_1$ (step 1104). When the value of the pixel to be encoded is the value of $P_1$, it is checked whether the pixels to the left and right of the pixel to be encoded have the same value (step 1105). When the pixels to the left and right of the pixel to be encoded have the same value, the value of $P_1$ is not encoded. When the pixels to the left and right of the pixel to be encoded have different values, the context information for encoding the pixel and the probability value for the arithmetic coding are calculated and the value $P_1$ is arithmetically coded (steps 1106 and 1107).

Figure 16C:
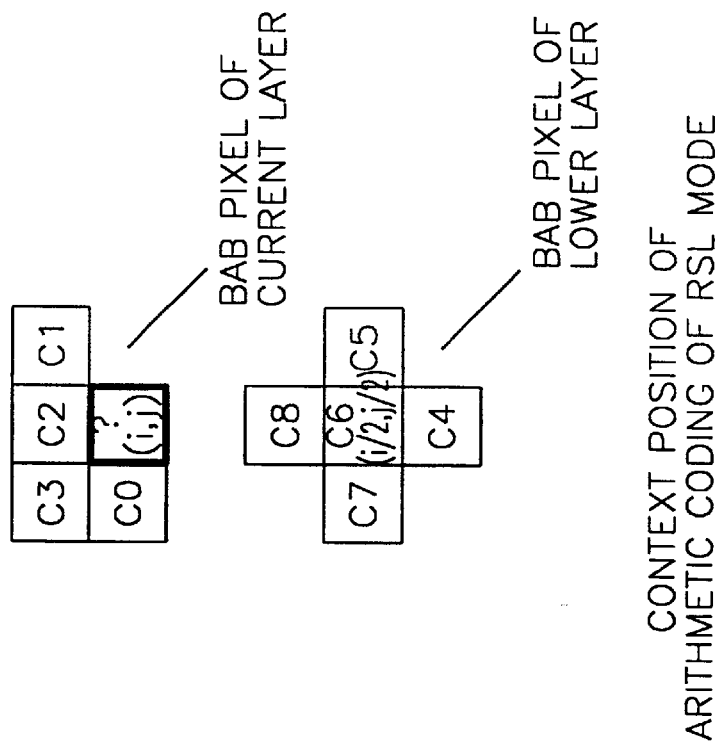
FIGS. 16A, 16B, and 16C show context information for binary arithmetic coding.
Figure 16B:
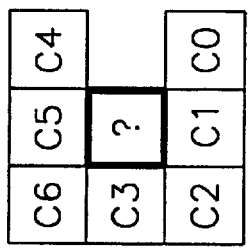
Figure 16A:
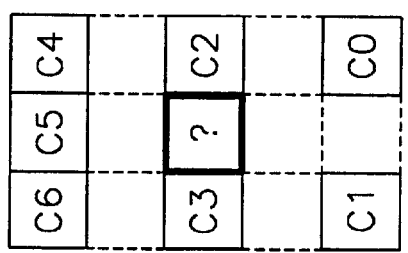

The context information for encoding the value of the pixel $P_1$ is shown in FIG. 16A. The context information is obtained by Equation 2 using 7 pixels around the pixel to be encoded.

$$C = \sum_k c_k \cdot 2^k \qquad \text{[Equation 2]}$$

It is possible to obtain the probability distribution of the value of the pixel to be encoded according to the value of the context information which shows the arrangement of the pixels around the pixel to be encoded and performs arithmetic coding on the pixel using the probability distribution as an input. If there are many 1s around the pixel to be encoded, there is a very high probability that the pixel to be encoded is 1. Therefore, it is possible to reduce the amount of bits when 1 is actually encoded. Also, in another context type, it is possible to effectively reduce the amount of bits of the pixel to be encoded. The probability distribution according to the context information of the value of $P_1$ used in the ISL encoding mode.

<Probability 1> static unsigned int scalable_xor_prob_1[128]={65476, 64428, 62211, 63560, 52253, 58271, 38098, 31981, 50087, 41042, 54620, 31532, 8382, 10754, 3844,6917, 63834, 50444, 50140, 63043, 58093, 45146, 36768, 13351, 17594, 28777, 39830, 38719, 9768, 21447, 12340, 9786, 60461, 41489, 27433, 53893, 47246, 11415, 13754, 24965, 51620, 28011, 11973, 29709, 13878, 22794, 24385, 1558, 57065, 41918, 25259, 55117, 48064, 12960, 19929, 5937, 25730, 22366, 5204, 32865, 3415, 14814, 6634, 1155, 64444, 62907, 56337, 63144, 38112, 56527, 40247, 37088, 60326, 45675, 51248, 15151, 18868, 43723, 14757, 11721, 62436, 50971, 51738, 59767, 49927, 50675, 38182, 24724, 48447, 47316, 56628, 36336, 12264, 25893, 24243, 5358, 58717, 56646, 48302, 60515, 36497, 26959, 43579, 40280, 54092, 20741, 10891, 7504, 8109, 30840, 6772, 4090, 59810, 61410, 53216, 64127, 32344, 12462, 23132, 19270, 32232, 24774, 9615, 17750, 1714, 6539, 3237, 152};

When the value of the pixel to be encoded is the value of $P_2$ or $P_3$, it is checked whether the pixels above and below the pixel to be encoded have the same value (step 1108). When the pixels above and below have the same value, the value of $P_2$ or $P_3$ is not encoded. When the pixels above and below have different values, the context information for encoding the pixel and the probability value for performing the arithmetic coding on the pixel are calculated and the arithmetic coding is performed on the value of $P_2$ or $P_3$ (steps 1109 and 1110). The context information for encoding the pixel values $P_2$ and $P_3$ is obtained by the Equation 2 using 7 pixels around the pixel to be encoded as shown in FIG. 16B. The probability distribution according to the context information of the values $P_2$ and $P_3$ used in the ISL encoding mode is as follows.

<Probability Distribution 2> static unsigned int scalable_xor_prob_23[128]= {65510, 63321, 63851, 62223, 64959, 62202, 63637, 48019, 57072, 33553, 37041, 9527, 53190, 50479, 54232, 12855, 62779, 63980, 49604, 31847, 57591, 64385,40657, 8402, 33878, 54743, 17873, 8707, 34470, 54322, 16702, 2192, 58325, 48447, 7345, 31317, 45687, 44236, 16685, 24144, 34327, 18724, 10591, 24965, 9247, 7281, 3144, 5921, 59349, 33539, 11447, 5543, 58082, 48995, 35630, 10653, 7123, 15893, 23830, 800, 3491, 15792, 8930, 905, 65209, 63939, 52634, 62194, 64937, 53948, 60081, 46851, 56157, 50930, 35498, 24655, 56331, 59318, 32209, 6872, 59172, 64273, 46724, 41200, 53619, 59022, 37941, 20529, 55026, 52858, 26402, 45073, 57740, 55485, 20533, 6288, 64286, 55438, 16454, 55656, 61175, 45874, 28536, 53762, 58056, 21895, 5482, 39352, 32635, 21633, 2137, 4016, 58490, 14100, 18724, 10461, 53459, 15490, 57992, 15128, 12034, 4340, 6761,1859, 5794, 6785, 2412, 35};

When one pixel value is encoded, it is checked whether the pixel is the last pixel of the BAB data (step 1111). When the pixel value is the last pixel, an encoded bit stream 1112 is obtained. When the pixel is not the last pixel, processes after the step 1102 are repeated with respect to a new pixel.

FIG. 12 is a flowchart describing the encoding method of the ISL mode in processes inverse to the processes of FIG. 11. When an encoded bit stream 1201 and a bordered BAB data 1202 are input, the encoded bit stream 1201 and the bordered BAB data 1202 are scanned in the encoding order of the ISL encoding mode (step 1203). The decoding of the ISL encoding mode is performed in the order shown in FIG. 15A. It is checked whether the pixel value to be restored is the value $P_0$ (step 1204). When the pixel value to be restored is the value $P_0$, the pixel value is restored to the value of the pixel $P_L$ of the lower layer (step 1205). When the pixel value to be restored is not the value $P_0$, it is checked whether the value of the pixel to be restored is the value of $P_1$ (step 1206).

When the value of the pixel to be restored is the value of $P_1$, it is checked whether the left and right pixel values ($C_3$ and $C_2$ in FIG. 16A) of the pixel value are equal to each other (step 1207). When $C_3$ and $C_2$ are equal to each other in FIG. 16A, $P_1$ is restored to the left and right pixel values $C_3$ and $C_2$ (step 1208). When $C_3$ is different to $C_2$, the context information for decoding the pixel and the probability value for performing the arithmetic decoding on the pixel value are calculated and $P_1$ is restored by performing the arithmetic decoding (steps 1209 and 1210). The context information for decoding the pixel value $P_1$ is obtained by the Equation 2 using 7 pixels shown in FIG. 16A around the pixel to be decoded. The probability distribution according to the context information of the value $P_1$ used in the ISL encoding mode is the same as the <Probability Distribution 1>.

When the pixel value to be restored is the value of $P_2$ or $P_3$, it is checked whether the pixel values ($C_1$ and $C_5$ of FIG. 16B) above and below the pixel value are equal to each other (step 1211). When $C_1$ is equal to $C_5$ in FIG. 16B, the value of $P_2$ or $P_3$ is restored to the top or bottom pixel value $C_1$ or $C_5$ (step 1212). When $C_1$ is different from $C_5$, the context information for encoding the pixel and the probability value for performing the arithmetic decoding on the pixel are calculated and the value of $P_2$ or $P_3$ is restored by performing the arithmetic decoding (steps 1213 and 1214). The context information for decoding the values of $P_2$ and $P_3$ is obtained by the Equation 2 using 7 pixels shown in FIG. 16B around the pixels to be decoded. The probability distribution according to the context information of the values of $P_2$ and $P_3$ used in the ISL encoding mode is the same as <Probability Distribution 2>. When one pixel is restored through the above decoding processes, it is checked whether the restored pixel is the last pixel of the BAB data (step 1215). When the pixel is the last pixel of the BAB data, restored BAB data 1216 is obtained. When the pixel is not the last pixel of the BAB data, processes after the step 1203 are repeated with respect to a new pixel.

FIG. 13 is a flowchart describing the encoding method of the RSL mode. When a BAB data 1301 bordered by the method of FIG. 9C is input, the respective pixels in the BAB are scanned in the encoding order of the RSL encoding mode (step 1302). The encoding order of the RSL encoding mode is shown in FIG. 15B. It is checked whether the pixel value to be encoded is the value of $P_0$ (step 1303). When the pixel value is the value of $P_0$, it is checked whether the pixel value $P_L$ of the lower layer corresponding to the current pixel position is 0 (step 1304). When the value of $P_L$ is 0, the pixel is not encoded. When the value of $P_L$ is 1, the context information for encoding the pixel and the probability value for performing the arithmetic encoding on the pixel are calculated and the arithmetic coding is performed on the value of $P_0$ (steps 1305 and 1306).

When the odd symmetry filter is used in the wavelet transformation from the upper layer to the lower layer, the position of one odd numbered point is changed into the low frequency bandwidth. When the even symmetry filter is used, the first odd numbered pixel is changed into the low frequency component. In the above two cases, since 0 is changed into 1 in the low frequency region of the lower layer, contrary to the encoding, there is a possibility that the value of $P_0$ is changed only when the pixel $P_L$ of the low frequency layer is 1 when the pixel is restored. Therefore, when the pixel $P_L$ is 0, the pixel is not encoded.

The context information for the RSL encoding is shown in FIG. 16C. The context information is obtained by the Equation 2 using 5 pixels ($C_4$, $C_5$, $C_6$, $C_7$, and $C_8$ of FIG. 16C) of lower layers and four pixels ($C_0$, $C_1$, $C_2$, and $C_3$ of FIG. 16C) around the pixel to be encoded of the current layer. The probability distribution according to the context information of the pixel to be encoded for the encoding of the RSL method is as follows.

<Probability Distribution 3> static unsigned int scalable_full_prob[512]={65524, 65478, 65524, 32768, 32768, 32768, 65464, 32768, 32768, 32768, 32768, 32768, 32768, 32768, 32768, 32768, 64349, 21570, 65373, 32768, 32768, 32768, 64685, 32768, 32768, 32768, 32768, 32768, 32768, 32768, 32768, 32768, 65246, 64528, 60948, 64479, 26214, 32768, 16843, 32768, 32768, 32768, 32768, 32768, 32768, 32768, 32768, 63498, 10078, 50130, 4010, 16384, 32768, 2773, 1316, 32768, 32768, 32768, 32768, 32768, 32768, 32768, 32768, 47058, 21126, 35436, 4626, 37137, 24876, 27151, 11722, 54032, 43538, 25645, 6858, 42976, 36599, 44237, 15996, 38096, 25303, 21007, 5307, 8618, 19293, 3021, 2416, 24740, 35226, 4369, 24858, 19920, 12336, 11718, 4390, 45487, 5313, 26464, 5354, 33556, 19876, 33099, 9713, 15749, 7876, 40867, 36223, 27065, 10377, 42337, 9907, 52230, 2688, 20906, 1269, 8507, 8987, 2929, 767, 23609, 18238, 18787, 32074, 24720, 10786, 34351, 1489, 65519, 65524, 65363, 32768, 32768, 32768, 64171, 32768, 65524, 65531, 32768, 32768, 32768, 32768, 32768, 32768, 65140, 50762, 65102, 32768, 32768, 32768, 62415, 32768, 50218, 41801, 32768, 32768, 32768, 32768, 32768, 32768, 64963, 65368, 59158, 64444, 32768, 32768, 15320, 32768, 65432, 65490, 65054, 65216, 32768, 32768, 32768, 32768, 61586, 52398, 43664, 16798, 4369, 32768, 2261, 8287, 46251, 53036, 33737, 26295, 32768, 32768, 32768, 32768, 60268, 31543, 25894, 11546, 32094, 35000, 19152, 15313, 60467, 30803, 30501, 22027, 55068, 27925, 50009, 14617, 62716, 34972, 23572, 13523, 5767, 22408, 2297, 7880, 48362, 21477, 15490, 21907, 46113, 3403, 36430, 2534, 46798, 6086, 28318, 13929, 16384, 25405, 19032, 14342, 31875, 8303, 43054, 27746, 30750, 11592, 45209, 6647, 49977, 8979, 19805, 3636, 7526, 13793, 1726, 874, 43735, 10691, 21314, 15586, 26597, 1637, 46751, 763, 65521, 64662, 65522, 32768, 65448, 32768, 65519, 32768, 65519, 32768, 65425, 32768, 65518, 32768, 65531, 32768, 64061, 24926, 65438, 32768, 65162, 32768, 65439, 32768, 65387, 32768, 65036, 32768, 65414, 32768, 65505, 32768, 65211, 61440, 64686, 63898, 31500, 32768, 51716, 32768, 54459, 32768, 50302, 32768, 36409, 32768, 39275, 32768, 62824, 17179, 55885, 9925, 36231, 32768, 39442, 5152, 44395, 32768, 40960, 32768, 31267, 32768, 40015, 32768, 37767, 21420, 58706, 9997, 47907, 16277, 31559, 4134, 63689, 53786, 29789, 15490, 53468, 24226, 25698, 10158, 24246, 19795, 41227, 10169, 15452, 11259, 5422, 1509, 42807, 52609, 37449, 27173, 20776, 10504, 18256, 3144, 40953, 4656, 62176, 6482, 35639, 13355, 33765, 4474, 44149, 27748, 48824, 31490, 40902, 12039, 22817, 2077, 46515, 3789, 49266, 5081, 15143, 12674, 4434, 337, 43468, 28306, 31069, 29457, 37942, 6798, 8863, 280, 65500, 65364, 65427, 32768, 64860, 32768, 65280, 32768, 65533, 65529, 65379, 32768, 65499, 32768, 65510, 32768, 63851, 34810, 65361, 32768, 64111, 32768, 65290, 32768, 063376, 46390, 64746, 32768, 65377, 56174, 65475, 32768, 65130, 65036, 61752, 64444, 23546, 32768, 37897, 32768, 64164, 65499, 59443, 65255, 36359, 32768, 41795, 32768, 60451, 46151, 49242, 18561, 21845, 32768, 24846, 11969, 55142, 53590, 37926, 25977, 41804, 32768, 37615, 32768, 60289, 26751, 45180, 16830, 39394, 34740, 24237, 7623, 65005, 61212, 31154, 37511, 63413, 31640, 57423, 8360, 61019, 31563, 47345, 23577, 15308, 13653, 17255, 5024, 59892, 49587, 26933, 31950, 54850, 8587, 41904,1255, 56552, 9777, 52370, 16762, 17118, 35915, 33507, 7744, 54902, 34383, 54875, 40718, 54047, 22218, 48436, 4431, 50112, 7519, 24647, 6361, 13569, 6303, 5215, 1078, 49640, 21245, 39984, 26286, 45900, 4704, 23108, 206};

When the pixel value to be encoded is not the value of $P_0$, the context information for encoding the pixel and the probability value for performing the arithmetic encoding on the pixel are calculated and arithmetic coding is performed on the values of $P_1$, $P_2$, or $P_3$ (steps 1307 and 1308). Every time a pixel value is encoded, it is checked whether the pixel is the last pixel of the BAB data (step 1309). When the pixel value is the last pixel, an encoded bit stream 1310 is obtained. When the pixel is not the last pixel, processes after the step 1302 are repeated with respect to a new pixel.

FIG. 14 is a flowchart describing an decoding method of the RSL mode in processes inverse to the processes of FIG. 13. When an encoded bit stream 1401 and bordered BAB data 1402 are input, the encoded bit stream 1401 is scanned in the encoding order of the RSL encoding mode step (1403). The decoding of the ISL encoding mode is performed in the order shown in FIG. 15B. It is checked whether the restored pixel value is the value of $P_0$ (step 1404). When the pixel value to be restored is the value of $P_0$, it is checked whether the value of the pixel of the lower layer $P_L$ corresponding to the current pixel position is 0 (step 1405). When the value of $P_L$ is 0, the value of $P_0$ is restored to 0. When the value of $P_L$ is 1, the context information for restoring the pixel and the probability value for performing the arithmetic decoding on the pixel are calculated and arithmetic decoding is performed on the value of $P_0$ (steps 1407 and 1408).

The context information for the RSL encoding is shown in FIG. 16C. The context information is obtained by the Equation 2 using five pixels ($C_4$, $C_5$, $C_6$, $C_7$, and $C_8$ of FIG. 16C) of lower layers and four pixels ($C_0$, $C_1$, $C_2$, and $C_3$ of FIG. 16C) around the pixel to be decoded of the current layer. The probability distribution according to the context information of the pixel to be decoded for the encoding of the RSL method is the same as <Probability Distribution 3>. When the pixel value to be decoded is not the value of $P_0$, the context information for restoring the pixel and the probability value for performing the arithmetic decoding on the pixel are calculated and the arithmetic decoding is performed on the values of $P_1$, $P_2$, or $P_3$ (steps 1409 and 1410). Every time a pixel is restored through the above decoding processes, it is checked whether the pixel is the last pixel of the BAB data (step 1411). When the pixel is the last pixel of the BAB data, restored BAB data 1412 is obtained. When the pixel is not the last pixel of the BAB data, processes after the step 1403 are repeated with respect to a new pixel.

FIG. 17A shows the structure of an object-based still image encoder including a tile operation. An input object 1700 is divided into tiles and a control signal is encoded. The respective tiles (tile 0, tile 1, . . . , and tile M−1) are encoded by the still image encoder 1703 as shown in FIG. 1 and each of the encoded bit streams are connected to each other by the lower multiplexer 1704. If there are more input objects to be encoded (for example, another input object 1710), the input objects are encoded by the same method and the encoded bit streams are obtained. The encoded bit streams are connected to a bit stream 1730 to be transmitted by the upper multiplexer 1720.

FIG. 17B is a block diagram showing processes of obtaining a restored image from the encoded bit stream 1730, which are inverse to the processes of FIG. 17A. The input bit stream 1730 is divided into encoded objects by an upper demultiplexer 1740. Each object is divided into a control signal component and a tile component by a lower demultiplexer 1750, reconstructing and is restored. A restored image with respect to each object is obtained by reconstructing the respective tile components (tile 0, tile 1, . . . , tile M−1). The respective restored images are reconstructed to a final output image 1790 by an object compositor 1780 and the final output image is output.

FIG. 17C shows a result of dividing an object of an arbitrary shape into tiles. When an input image (C01) is divided into tiles, there are tiles (C02) in which shape information does not exist, tiles (C03) in which shape information partially exists, and a tile (C04) which is inside the object. (C05) denotes tiles required to be encoded. Each tile is independently encoded by an encoder like an input image. A control signal required for encoding the tiles is additionally encoded to control an output image.

FIGS. 18A through 18F show bit stream syntaxes showing the entire operation of the scalable encoder with respect to a still image using the wavelet transformation according to the present invention. Here, the bit stream shows data compressed by an encoder in the form of binary values of "0" and "1".

StillTextureObject ( ) of FIG. 18A includes a bit stream syntax showing the operation processes of the encoder. (L001) denotes a start code for distinguishing the object to be encoded from other objects. When various object information items exist in the encoded information, the object information items are classified by the start code. Therefore, a unique name is assigned to each object to distinguish one object from another. StillTextureHeader ( ) of (L002), which is described in detail in FIG. 18B, denotes various additional information items required for performing the encoding. (L003) through (L007) denote information on the size of the input image when input shape information does not have an arbitrary shape. When the input image has an arbitrary shape, processes (L008) through (L019) are performed. (L008) through (L019) include the starting point and the size of a border region which surrounds the shape information and processes of encoding the shape information when tiles are not used. The decoding of the shape information, shape__object_decoding ( ) is described in detail in FIG. 18E. (L020) and (L021) shown in detail in FIG. 18C denote various control signals required for the tile operation. The encoding of the information in the tile is performed in StillTextureTile ( ) of (L022), which is described in detail in FIG. 18D.

StillTextureHeader ( ) of FIG. 18B denotes various additional information items required for performing the encoding. (L101) denotes whether the tile operation is used. (L102) denotes the identifier (ID) of the object to be encoded. marker_bit of (L103) is a value for preventing a start code from existing in another encoded data. (L104) through (L108) denote various additional information items related to the wavelet transformation and the encoding. (L109) denotes whether the input object has shape information and whether the shape information is to be encoded. (L110) through (L128) relate to input of scaling related additional information and filtering coefficients.

StillTextureTileControl ( ) of FIG. 18C denotes various control signals required for the tile operation. (L201) through (L206) denote the sizes of the tiles in the vertical and horizontal directions and the number of tiles to be encoded in the input image. In order to directly restore a tile arbitrarily designated by a user in the bit stream, (L207) through (L215) denote the amount of bits used for encoding the respective tiles in units of a byte. A value of 32 bits is expressed by two 16 bit values.

StillTextureTile ( ) of FIG. 18D denotes actual processes of encoding shape and texture information in a tile. (L303), which denotes the start code of each item of tile information, lets a user distinguish desired tile information from another item of tile information and restore the desired tile information together with the identifier (ID) of (L304). (L307) denotes three kinds of tiles as shown in FIG. 17C. (L310) through (L312) show processes of encoding the shape information in a tile using the scalable encoder according to the present invention only in the case where the shape information partially exists in a tile. StillTextureDecoding ( ) of (L314) shown in detail in FIG. 18F denotes processes of encoding the texture component using information on the position of an encoded shape coefficient. StillTextureDecoding ( ) will not be described in detail since it is not directly related to the contents of the present invention.

Shape_object_decoding ( ) of FIG. 18E denotes processes of scalably decoding the shape information. (L401) through (L417) denote processes of encoding the shape information of a base layer. (L406) and (L407) denote the number of BABs in the vertical and horizontal directions. When the tile operation is not used (tiling_disable==1), object_width (L013) and object_height (L015) of FIG. 18A are used. When the tile operation is used, tile_width and tile_height of (L201) and (L203) of FIG. 18C are used. Also, wavelet_decomposition_levels of (L106) of FIG. 18B which denotes the number of layers is used. The processes of encoding the shape information of the base layer are shown as follows.

```
int shape_base_layer_height_blocks ( )
{ int height;
    if(tiling_disable==1)
        height=((object_height>>wavelet_decomposition_levels)+15) / 16;
    else
        height = ((tile_height>>wavelet_decomposition_levels)+15) / 16;
    return height;
}
int shape_base_layer_width_blocks ( )
{ int width;
    if (tiling_disable==1)
        width = ((object_width>>wavelet_decomposition_levles)+15) / 16;
    else
        width = ((tile_width>>wavelet_decomposition_levels)+15) / 16;
    return width;
}
``` wherein, >> represents a shift operator.

(L417) through (L439) denote processes of scalably encoding the shape information in the upper layers. In this case, the encoding is performed by the ISL encoding or the RSL decoding according to the encoding mode. (L421) and (L422) and (L434) and (L435) denote the numbers of the BABs to be encoded in the upper layers in the vertical and horizontal directions. object_width (L013) and object_height (L015) of FIG. 18A are used as the numbers of the BABs to be encoded in the upper layers in the vertical and horizontal directions when the tile operation is not used (tiling_disable==1) like in the base layer. tile_width (L201) and tile_height (L203) of FIG. 18C are used as the numbers of the BABs to be encoded in the upper layers in the vertical and horizontal directions when the tile operation is used. Also, wavelet_decomposition_levels of (L106) of FIG. 18B which denotes the number of layers of the wavelet transformation is used. The processes of scalably encoding the shape information in the upper layers are shown as follows.

```
Int shape_enhanced_layer_height_blocks( )
{ int height;
    if(tiling_disable==1) {
        height=
            ((object_height>>(wavelet_decomposition_levels-L+ 1))+bab_size-1)
            / bab_size;
    } else {
        height=
            ((tile_height>>(wavelet_decomposition_levels-L+1))+bab_size-1)
            / bab_size;
    }
    return height;
}
int shape_enhanced_layer_width_blocks( )
{ int width;
    if(tiling_disable==1) {
        width=
            ((object_width>>(wavelet_decomposition_levels-L+1))+bab_size-1)
            / bab_size
    } else {
        width=
            ((tile_width>>(wavelet_decomposition_levels-L+1))+bab_size-1)
            / bab_size;
    }
    return width;
}
``` wherein, L denotes to which numbered layer the shape information belong among the upper layers. bab_size denotes the size of the BAB of the upper layer in the vertical and horizontal directions, which can be shown as follows according to the size of the input image.

```
if(tiling_disable==1) {
    layer_width = object_width>>(wavelet_decomposition_levels-L+1);
    layer_height = object_height>>(wavelet_decompositioon_levels-L+1);
} else {
    layer_width = tile_width>>(wavelet_decomposition_levels-L+1);
    layer_height = tile_height>>(wavelet_decomposition_levels-L+1);
}
if(layer_width>=1024 || layer_height>=1024) bab_size = 64;
else if(layer_width>=512 || layer_height>=512) bab_size = 32
else                                           bab_size = 16
```

The above is applied in order to prevent the encoding efficiency from deteriorating by variably increasing the sizes of blocks according to the size of the input image since the encoding efficiency deteriorates when a large input image is divided into small blocks and the blocks are encoded.

enh_binary_arithmetic_decode ( ) of (L424) and (L436) denotes actual processes of encoding pixels in the BAB by the scalable encoder using the context information of the pixels around the pixel to be encoded and the arithmetic encoder. A first value denotes whether the BAB is encoded in the ISL encoding mode or the RSL encoding mode. Remaining values include processes of performing arithmetic encoding on pixels of an image including the shape information using the context information of the pixels around the pixel to be encoded.

StilTextureDecoding ( ) of FIG. 18F denotes processes of wavelet-based scalably encoding the texture information using the shape information obtained from FIG. 18E. a detailed description of the processes will be omitted since the processes are beyond the scope of the present invention.

According to the scalable encoder of a still image using wavelets, it is possible to efficiently encode pixels by reducing the number of pixels to be encoded using the characteristics between ISL pixels of the layer to be encoded or pixels between two layers in encoding the shape information between the respective layers. Therefore, it is possible to sequentially restore the shape information of the still image as well as the texture information of the still image by performing the scalable encoding according to the resolution of an image, which can be efficiently applied to searching for an image in a large capacity data base such as a digital library. It is possible to reduce the number of pixels to be encoded and to simplify the encoding processes by the scalable encoder for encoding the shape information according to the present invention compared with other encoders.

Also, according to the present invention, it is possible to restore desired parts of the image among the encoded bit streams with a small amount of calculation and at a high speed by using a tile operation to which only the specific parts of the input image are independently applied. The application field related to the encoding of the shape information is extended to still images having an arbitrary shape due to the tile operation. In particular, it is possible to restore desired parts by reducing the memory capacity and the amount of calculation with respect to an object in a large image. Such an extension can be efficiently applied to image communication such as the international mobile telecommunications 2000 (IMT-2000) terminal. Since the resolution of a terminal is restricted by the bandwidth of a channel, it is preferable to use the tile operation for applying a part of a large image.

The encoding efficiency of the present invention is shown in the following experiment. Tables 1 and 2 respectively show the shape information amount in bits of the respective layers with respect to the image of children and the image of Fish & Logo (352×240, SIF format picture). When the odd symmetry filter and even symmetry filter having five layers are used, the number of bits of the shape information in the respective layers of the scalable encoder according to the present invention is compared with the total shape number of bits of a general shape information encoder such as context-based arithmetic encoder (CAE). In the case of the odd symmetry filter, the shape information of the chrominance (UV) component is encoded. In the even symmetry filter, it is possible to restore the shape information of the chrominance (UV) component by encoding only the shape information of the luminance (Y) component. In spite of this, it is noted from the result of the experiment that the two filters have similar encoding performances. This is because the number of pixels to be encoded in the even symmetry filter is almost equal to the number of pixels to be encoded in the odd symmetry filter since there are more RSL encoding modes in the case of the even symmetry filter. It is noted that the number of bits increases by about 17 through 25% in the encoder according to the present invention compared with the CAE. However, since it is possible to reduce the number of bits and complexity with respect to the shape information in lower layers, it is possible to realize an efficient resolution scalable encoder together with the scalable encoder with respect to the texture information.

TABLE 1

Number of bits of shape information of each layer of image of children

| Number of layers | Odd symmetry filter (scalable) | | | Odd symmetry filter (scalable) | | CAE |
|---|---|---|---|---|---|---|
| | Y shape | UV shape | Accumulated number of bits | Y shape | Accumulated number of bits | Number of bits |
| LL bandwidth | 57 | 58 | 115 | 58 | 58 | — |
| Layer 0 | 113 | — | 228 | 72 | 130 | — |
| Layer 1 | 184 | 43 | 455 | 169 | 299 | — |
| Layer 2 | 298 | 58 | 811 | 313 | 612 | — |
| Layer 3 | 526 | 85 | 1422 | 700 | 1312 | — |
| Layer 4 | 904 | 141 | 2467 | 1325 | 2637 | — |
| Total number of bits | 2082 | 385 | 2467 (17.2%) | 2637 | 2637 (25%) | 2105 |

TABLE 2

Number of bits of shape information of each layer of Fish & Logo image

| Number of layers | Odd symmetry filter (scalable) | | | Odd symmetry filter (scalable) | | CAE |
|---|---|---|---|---|---|---|
| | Y shape | UV shape | Accumulated number of bits | Y shape | Accumulated number of bits | Number of bits |
| LL bandwidth | 80 | 45 | 125 | 45 | 45 | — |
| Layer 0 | 125 | — | 250 | 70 | 115 | — |
| Layer 1 | 323 | 40 | 613 | 222 | 337 | — |
| Layer 2 | 763 | 56 | 1432 | 595 | 932 | — |

TABLE 2-continued

Number of bits of shape information of each layer of Fish & Logo image

| Number of layers | Odd symmetry filter (scalable) | | | Odd symmetry filter (scalable) | | CAE |
|---|---|---|---|---|---|---|
| | Y shape | UV shape | Accumulated number of bits | Y shape | Accumulated number of bits | Number of bits |
| Layer 3 | 1435 | 83 | 2950 | 1533 | 2465 | — |
| Layer 4 | 2262 | 138 | 5350 | 2955 | 5420 | — |
| Total number of bits | 4988 | 362 | 5350 (23.8%) | — | 5420 (25%) | 4321 |

Figure 19A:
FIGS. 19A and 19B show restored images (using an odd symmetry filter) in a layer 3 of an image of children, in which the shape information of a chrominance (UV) component is not corrected in FIG. 19A and the shape information of the chrominance (UV) component is corrected in FIG. 19B.
Figure 19B:
Figure 20A:
FIGS. 20A and 20B show restored images (using an odd symmetry filter) in a layer 3 of an image of Fish & a Logo, in which the shape information of the chrominance (UV) component is not corrected in FIG. 20A and the shape information of the chrominance (UV) component is corrected in FIG. 20B.
Figure 20B:

FIGS. 19A and 19B show the results of restoring the image of children in the layer 3. FIGS. 20A and 20B show the results of restoring the Fish & Logo image in the layer 3. FIGS. 19A and 20A show results of downsampling the shape information on the luminance (Y) component by performing the OR operation when the shape information on the chrominance (UV) component is obtained. It is noted that the color is faded in the middle layer of the resolution scalable structure since the chrominance (UV) image value corresponding to the border of the luminance (Y) image does not exist. FIGS. 19B and 20B show the results of removing the fading of the color through the processes of compensating for the chrominance (UV) image as shown in FIGS. 2 and 3.

What is claimed is:

1. A method of scalably encoding shape information on a still image using a wavelet transformation, comprising the steps of:
   (a) wavelet transforming and scalably encoding shape information on a luminance (Y) component;
   (b) wavelet encoding texture information on the luminance (Y) component using the shape information on the luminance (Y) component wavelet transformed in the step (a);
   (c) padding shape information and texture information on a chrominance (UV) component using the shape information on the luminance (Y) component and texture information on the chrominance (UV) component;
   (d) wavelet transforming and scalably encoding the padded shape information on the chrominance (UV) component; and
   (e) wavelet encoding the texture information on the chrominance (UV) component using the shape information on the chrominance (UV) component wavelet transformed in the step (d).

2. The method of claim 1, wherein the steps (a) and (d) each comprises the steps of:
   (a1) obtaining respective layers by shape adaptive discrete transforming input shape information;
   (a2) encoding the low frequency bandwidth shape information of the lowest shape layer;
   (a3) scalably encoding the low frequency bandwidth shape information of each layer using the low frequency bandwidth shape information of lower layer with respect to each of the shape layers excluding the lowest shape layer; and
   (a4) transmitting the encoded shape information from the lowest layer to uppermost layer.

3. The method of claim 2, wherein the step (a3) comprises the steps of:
   (a31) dividing the low frequency bandwidth shape information of the current layer and the low frequency bandwidth shape information of lower layers into blocks;
   (a32) bordering the respective blocks in the shape information; and
   (a33) determining the encoding mode, performing arithmetic coding on the determined encoding mode, and encoding the bordered block according to the determined encoding modes, with respect to each of the bordered blocks.

4. The method of claim 3, wherein, when a 1×1 pixel value $P_L$ of a binary alpha block (BAB) $f_1(i, j)$ of a lower layer corresponds to 2×2 pixel values $P_0$, $P_1$, $P_2$, and $P_3$ of a BAB $f_2(i, j)$ of the current layer, the encoding mode is determined to be an interleaved scan line (ISL) mode when all of the following conditions are satisfied with respect to all pixels in the BAB of the lower layers, and the encoding mode is determined to be a raster scan line (RSL) mode when any of the following conditions are not all satisfied.

$$ondition1 = (f_2(2i, 2j) == f_1(i,j))$$

$$ondition2 = !(!(f_2(2i, 2j) \oplus f_2(2i+2, 2j) \&\& (f_2(2i+1, 2j)! = f_2(2i, 2j))$$

$$ondition3 = !(!(f_2(2i, 2j) \oplus f_2(2i, 2j+2) \&\& (f_2(2i, 2j+1)! = f_2(2i, 2j))$$

$$ondition4 = !(!(f_2(2i+1, 2j) \oplus f_2(2i+1, 2j+2) \&\& (f_2(2i+1, 2j+1)! = f_2(2i+1, 2j))$$

5. The method of claim 4, wherein, when the encoding mode is the ISL encoding mode, with respect to each pixel of the block, the step (a33) comprises the steps of:
   (a331) not encoding $P_0$ when the pixel value to be encoded is $P_0$;
   (a332) calculating context information showing the arrangement of pixels of the current layer around the pixel to be encoded and a probability value for performing arithmetic coding on the pixel to be encoded only when left and right pixel values of the pixel value to be encoded are different from each other and performing the arithmetic encoding on $P_1$ when the pixel value to be encoded is $P_1$; and
   (a333) calculating the context information showing the arrangement of pixels of the current layer around the pixel to be encoded and the probability value for performing the arithmetic coding on the pixel to be encoded only when the pixel values above and below the pixel value to be encoded are different from each other and performing the arithmetic coding on $P_2$ or $P_3$ when the pixel value to be encoded is $P_2$ or $P_3$.

6. The method of claim 4, wherein, when the encoding mode is the RSL mode with respect to each pixel of the block, the step (a33) comprises the steps of:
   (a331) not encoding $P_0$ when the pixel value to be encoded is $P_0$ and the corresponding $P_L$ is 0;
   (a332) calculating the context information showing the arrangement of pixels of the current layer and lower layers around the pixel to be encoded and the probability value for performing the arithmetic coding on the pixel to be encoded and performing the arithmetic coding on $P_0$ when the pixel value to be encoded is $P_0$ and the corresponding pixel value $P_L$ is not 0; and
   (a333) calculating the context information showing the arrangement of the pixels of the current layer and the lower layers around the pixel to be encoded and the probability value for performing the arithmetic coding on the pixel to be encoded and performing the arithmetic coding on $P_1$, $P_2$, or $P_3$ when the pixel value to be encoded is $P_1$, $P_2$, or $P_3$.

7. The method of claim 1, wherein the shape information on the luminance (Y) component is wavelet transformed by an even symmetry wavelet filter and is scalably encoded in the step (a), and the steps (c) and (d) are not performed.

8. The method of claim 1, wherein the step (c) comprises the steps of:

(c1) obtaining downsampled shape information from shape information on the luminance (Y) component for compensating for the chrominance (UV) component of 4:2:0 or 4:2:2;

(c2) dividing the downsampled shape information into blocks corresponding to the number of layers and extending the shape information to a region including all pixels of boundary blocks which are partially comprising the shape respectively; and (c3) obtaining texture information corresponding to the extended region by padding the texture information on the chrominance (UV) component in the horizontal and vertical directions.

9. A method for scalably decoding encoded shape information on a still image using wavelet transformation, comprising the steps of:

(a) scalably decoding and wavelet transforming the encoded shape information on the luminance (Y) component;

(b) wavelet decoding the encoded texture information on the luminance (Y) component using the shape information on the luminance (Y) component wavelet transformed in the step (a);

(c) scalably decoding and wavelet transforming the encoded shape information on the chrominance (UV) component; and (d) wavelet decoding the encoded texture information on the chrominance (UV) component using the shape information on the chrominance (UV) component wavelet transformed in the step (c).

10. The method of claim 9, wherein the steps (a) and (c) comprise the steps of:

(a1) receiving encoded shape information from the lowest layer to uppermost layer;

(a2) obtaining the low frequency bandwidth shape information of the lowest layer by decoding the encoded shape information of the lowest layer;

(a3) scalably decoding the low frequency bandwidth shape information by decoding the encoded shape information of each layer using the low frequency bandwidth shape information of lower layers with respect to the respective layers excluding the lowest layer; and (a4) obtaining the respective layers by shape adaptive discrete wavelet transforming the low frequency bandwidth shape information of the decoded respective layers.

11. The method of claim 10, wherein the step (a3) comprises the steps of:

(a31) receiving encoded shape information and dividing the shape information of the current shape layer and the shape information of the lower layers into blocks;

(a32) bordering the respective blocks in the shape information; and (a33) performing arithmetic decoding on the encoding modes of the respective bordered blocks and decoding the encoded shape information in each block according to the decoded encoding mode.

12. The method of claim 11, wherein, when a 1×1 pixel value $P_L$ of a binary alpha block (BAB) $f_1(i, j)$ of a lower layer corresponds to 2×2 pixel values $P_0$, $P_1$, $P_2$, and $P_3$ of a BAB $f_2(i, j)$ of the current layer, the encoding mode is determined to be an interleaved scan line (ISL) mode when all of the following conditions are satisfied with respect to all pixels in the BAB of the lower layers and the encoding mode is determined as a raster scan line (RSL) mode when any of the following conditions are not satisfied.

ondition1=$(f_2(2i, 2j)==f_1(i, j))$ ondition2=$!(!(f_2(2i, 2j) \oplus f_2(2i+2, 2j) \& \& (f_2(2i+1, 2j)!=f_2(2i, 2j))$ ondition3=$!(!(f_2(2i, 2j) \oplus f_2(2i, 2j+2) \& \& (f_2(2i, 2j+1)!=f_2(2i, 2j))$ ondition4=$!(!(f_2(2i+1, 2j) \oplus f_2(2i+1, 2j+2) \& \& (f_2(2i+1, 2j+1)!=f_2(2i+1, 2j))$ 13. The method of claim 12, wherein, when the encoding mode is the ISL encoding mode, with respect to each pixel of the block, the step (a33) comprises the steps of:

(a331) restoring $P_0$ by $P_L$ when the pixel value to be decoded is $P_0$;

(a332) restoring $P_0$ by the pixel value to the left or right of the pixel value to be decoded when the pixel value to be decoded is $P_1$ and the pixel values to the left and right of the pixel value are equal to each other, and calculating the context information showing the arrangement of the pixels of the current layer around the pixel to be decoded and the probability value for performing the arithmetic decoding on the pixel to be decoded and performing the arithmetic decoding on $P_1$ when the pixel value to be decoded is $P_1$ and the pixel values to the left and right of the pixel value to be decoded are different from each other; and (a333) decoding $P_2$ or $P_3$ by the pixel value above or below the pixel value to be decoded when the pixel value to be decoded is $P_2$ or $P_3$ and the pixel values above or below the pixel value are equal to each other and calculating the context information showing the arrangement of the pixels of the current layer around the pixel to be encoded and probability value for performing arithmetic decoding on the pixel to be decoded and performing arithmetic decoding on $P_2$ or $P_3$ when the pixel value to be decoded is $P_2$ or $P_3$ and the pixel values above and below the pixel value are different from each other.

14. The method of claim 12, wherein, when the encoding mode is the RSL encoding mode, with respect to each pixel of the block, the step (a33) comprises the steps of:

(a331) restoring $P_0$ by 0 when the pixel value to be decoded is $P_0$ and the corresponding $P_L$ is 0;

(a332) calculating the context information showing the arrangement of the pixels of the current layer and the lower layers around the pixel to be decoded and the probability value for performing the arithmetic decoding on the pixel to be decoded and performing the arithmetic decoding on $P_0$ when the pixel value to be decoded is $P_0$ and the corresponding $P_L$ is not 0; and (a333) calculating the context information showing the arrangement of the pixels of the current layer and the lower layers around the pixel to be decoded and the probability value for performing the arithmetic decoding on the pixel to be decoded and performing the arithmetic decoding on $P_1$, $P_2$, or $P_3$ when the pixel value to be decoded is $P_1$, $P_2$, or $P_3$.

15. An apparatus for scalably encoding shape information on a still image using wavelet transformation, comprising:
- a shape information scalable encoder for wavelet transforming and scalably encoding the shape information of a luminance (Y) component and a chrominance (UV) component;
- a chrominance (UV) image shape/texture padding unit for padding shape information and texture information of a chrominance (UV) component using shape information of a luminance (Y) component and texture information of a chrominance (UV) component with respect to 4:2:0 or 4:2:2 shape information; and
- a texture information wavelet encoder for wavelet encoding the texture information of the luminance (Y) component and the chrominance (UV) component using the shape information wavelet transformed by the shape information scalable encoder.

16. The apparatus of claim 15, wherein the shape information scalable encoder comprises:
- a luminance (Y) shape scalable encoder for wavelet transforming and scalably encoding the shape information of the luminance (Y) component; and
- a chrominance (UV) shape scalable encoder for wavelet transforming and scalably encoding the shape information of the chrominance (UV) component padded by the chrominance (UV) image shape/texture padding unit.

17. The apparatus of claim 16, the luminance (Y) shape scalable encoder and the chrominance (UV) shape scalable shape encoder each comprises:
- a plurality of shape adaptive discrete wavelet transformers for receiving shape layers and generating the shape layers of lower layers;
- a shape encoder for encoding the low frequency bandwidth shape information of the lowest shape layer;
- a plurality of scalable encoders for scalably encoding the low frequency bandwidth shape information of the respective layers using the low frequency bandwidth shape information of the lower layers with respect to the respective shape layers excluding the lowest shape layer; and
- a multiplexer for transmitting the encoded shape information from the lowest layer to the upper layers.

18. The apparatus of claim 17, wherein each scalable encoder comprises:
- means for dividing the low frequency bandwidth shape information of the current layer and the low frequency bandwidth shape information of the lower layers into blocks;
- means for bordering the respective blocks in the shape information;
- means for determining the encoding mode according to the possibility of using exclusive OR information of each pixel in the bordered block;
- means for scanning the respective pixels in a block in the ISL order and omitting encoding the pixels when exclusive OR information can be used and obtaining the context information and performing the arithmetic coding on the pixels when the exclusive OR information cannot be used, when the encoding mode is the ISL encoding mode; and
- scanning the respective pixels in a block in the RSL order, obtaining the context information and performing the arithmetic coding on the pixels when the encoding mode is the RSL encoding mode.

19. An apparatus for scalably decoding encoded shape information on a still image using wavelet transformation, comprising:
- a shape information scalable decoder for scalably decoding and wavelet transforming the encoded shape information on the luminance (Y) component and the chrominance (UV) component; and
- a texture information wavelet decoder for wavelet decoding encoded texture information on the luminance (Y) component and the chrominance (UV) component using the shape information wavelet transformed by the shape information scalable decoder.

20. The apparatus of claim 19, wherein the shape information scalable decoder comprises:
- a luminance (Y) shape scalable decoder for scalably decoding and wavelet transforming the encoded shape information on the luminance (Y) component; and
- a chrominance (UV) shape scalable decoder for scalably decoding and wavelet transforming the encoded shape information on the chrominance (UV) component.

21. The apparatus of claim 20, wherein the luminance (Y) shape scalable decoder and the chrominance (UV) shape scalable shape decoder each comprises:
- a demultiplexer for distributing the encoded shape information from the lowest layer to upper layers;
- a shape decoder for obtaining the low frequency bandwidth shape information of the lowest layer by decoding the encoded shape information of the lowest shape layer;
- a plurality of scalable decoders for scalably decoding the low frequency bandwidth shape information by decoding the encoded shape information of the respective layers using the low frequency bandwidth shape information, with respect to the respective shape layers excluding the lowest shape layer; and
- a plurality of shape adaptive discrete wavelet transformers for obtaining each of the shape layers by shape adaptive discrete wavelet transforming the decoded low frequency bandwidth shape information of the respective layers.

22. The apparatus of claim 21, wherein each scalable decoder comprises:
- means for receiving encoded shape information and dividing the shape information of the current layer and the shape information of the lower layers into blocks;
- means for bordering the respective blocks in the shape information;
- means for performing arithmetic decoding on the encoding mode determined according to the possibility of using the exclusive OR information of the respective pixels in the bordered block;
- means for scanning the respective pixels in a block in the ISL order decoding and decoding the pixels by exclusive OR information when the exclusive OR information can be used and obtaining the context information and performing the arithmetic decoding on the pixels when the exclusive OR information cannot be used, when the encoding mode is the ISL encoding mode; and
- means for scanning the respective pixels in a block, obtaining the context information, and performing the arithmetic decoding on the pixels, when the encoding mode is the ISL encoding mode.

* * * * *